United States Patent
Ichimi et al.

[11] Patent Number: 5,999,983
[45] Date of Patent: *Dec. 7, 1999

[54] COMMUNICATION CONTROL UNIT SWITCHED BETWEEN ACTIVE AND STAND-BY FUNCTIONS AUTOMATICALLY IN RESPONSE TO MONITORED STATUS OF A DIFFERENT COMMUNICATION CONTROL UNIT CONNECTED TO A COMMON NETWORK

[75] Inventors: Masahiro Ichimi; Hideo Takahashi, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,147

[22] Filed: Jul. 23, 1997

[30] Foreign Application Priority Data

Jan. 20, 1997 [JP] Japan .................................. 9-007096

[51] Int. Cl.⁶ .................................. H04J 3/26; H04J 3/00
[52] U.S. Cl. .......................... 709/239; 709/209; 370/220; 370/221
[58] Field of Search .............................. 395/200.69, 311; 370/221, 220; 709/239, 209

[56] References Cited

U.S. PATENT DOCUMENTS

| | | | |
|---|---|---|---|
| 5,014,261 | 5/1991 | Shinbashi et al. | 370/220 |
| 5,253,248 | 10/1993 | Dravida et al. | 370/228 |
| 5,365,511 | 11/1994 | Kusano | 370/220 |
| 5,435,003 | 7/1995 | Chong et al. | 395/182.02 |
| 5,448,573 | 9/1995 | Yamaguchi | 395/182.02 |
| 5,689,646 | 11/1997 | Thorson | 395/200.69 |
| 5,721,817 | 2/1998 | Kurihara et al. | 395/200.57 |

FOREIGN PATENT DOCUMENTS

| | | |
|---|---|---|
| 3-280144 | 12/1991 | Japan . |
| 4-299743 | 10/1992 | Japan . |
| 5-210607 | 8/1993 | Japan . |
| 6-53995 | 2/1994 | Japan . |

*Primary Examiner*—Krisna Lim
*Attorney, Agent, or Firm*—Staas & Halsey LLP

[57] ABSTRACT

A system comprised of multiplexed communication control units and a communication control unit for such multiplexing, where the switching between the stand-by unit and the active unit at the time of an abnormality can be performed in a short time and the cause of a breakdown obstructing operation can be grasped from the condition of the transmission line and the switching made conditional on that condition, thereby enabling highly reliable communication. The communication control units are connected in a multidrop configuration and both of the active unit and the stand-by unit are kept activated (communicable in state). The stand-by communication control unit transmits a frame through the transmission line at a timing not obstructing the communications, so it is possible to detect an abnormality in the active unit and rapidly switch to the stand-by unit at the time of an abnormality using the unit switching processing unit.

39 Claims, 18 Drawing Sheets

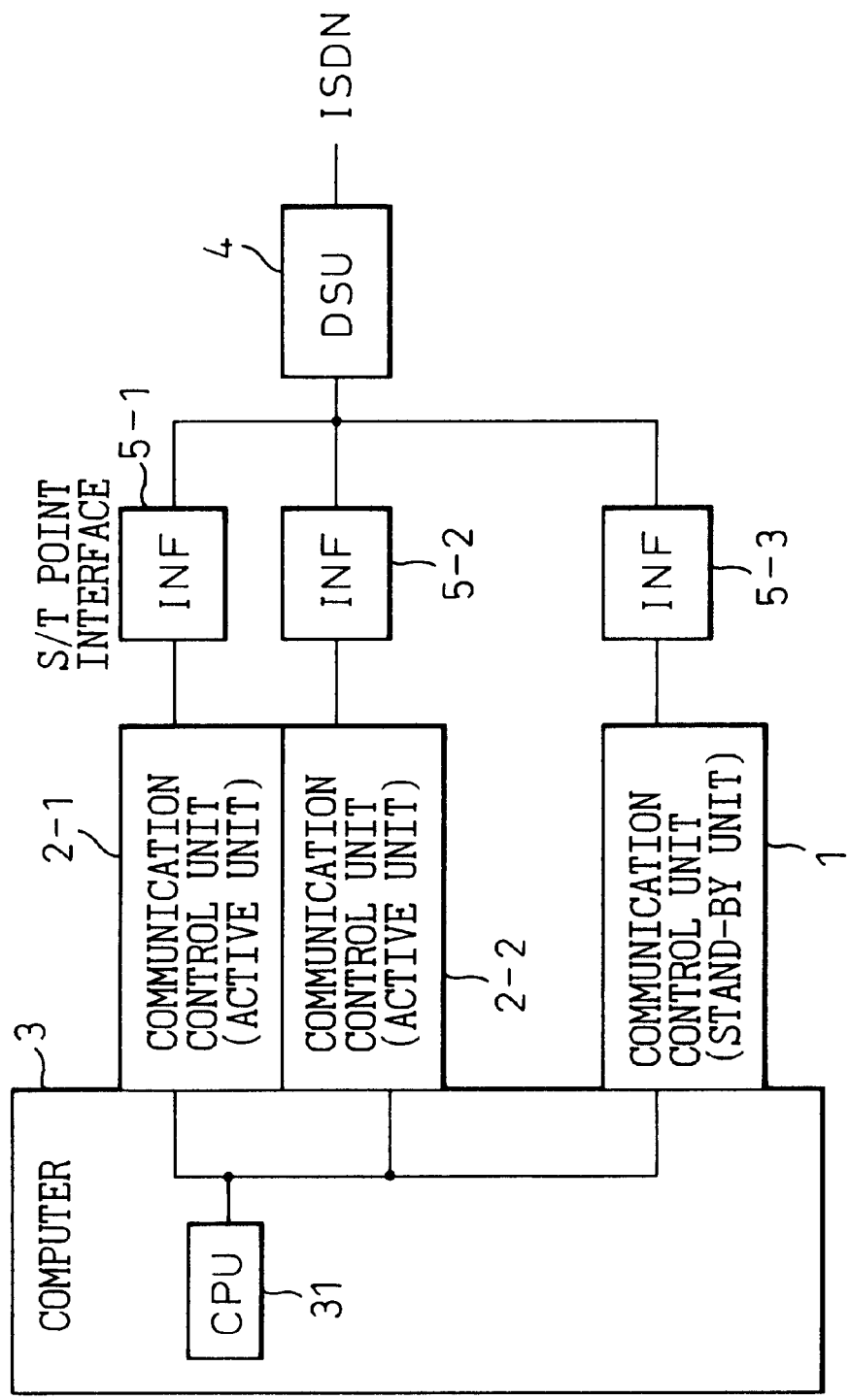

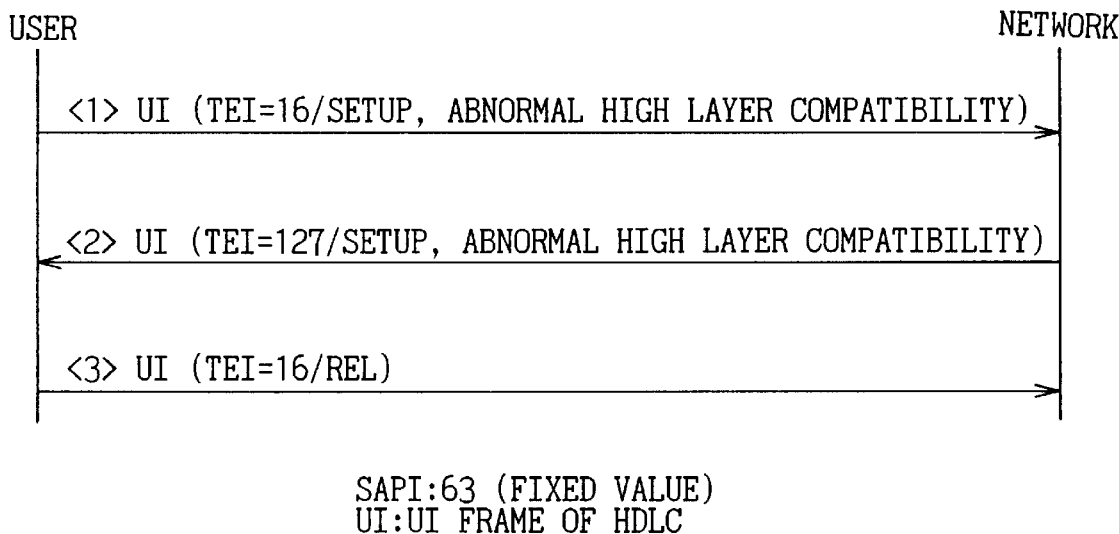
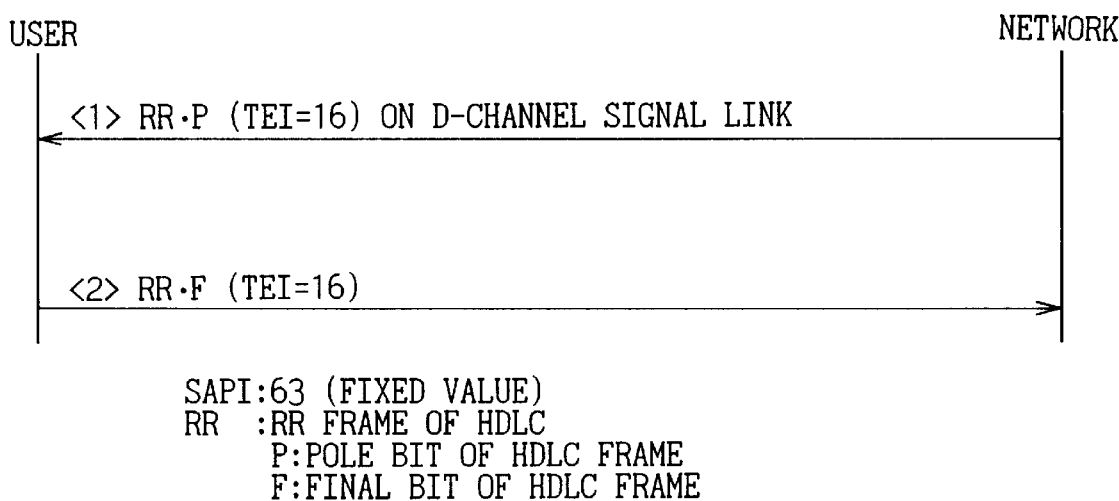

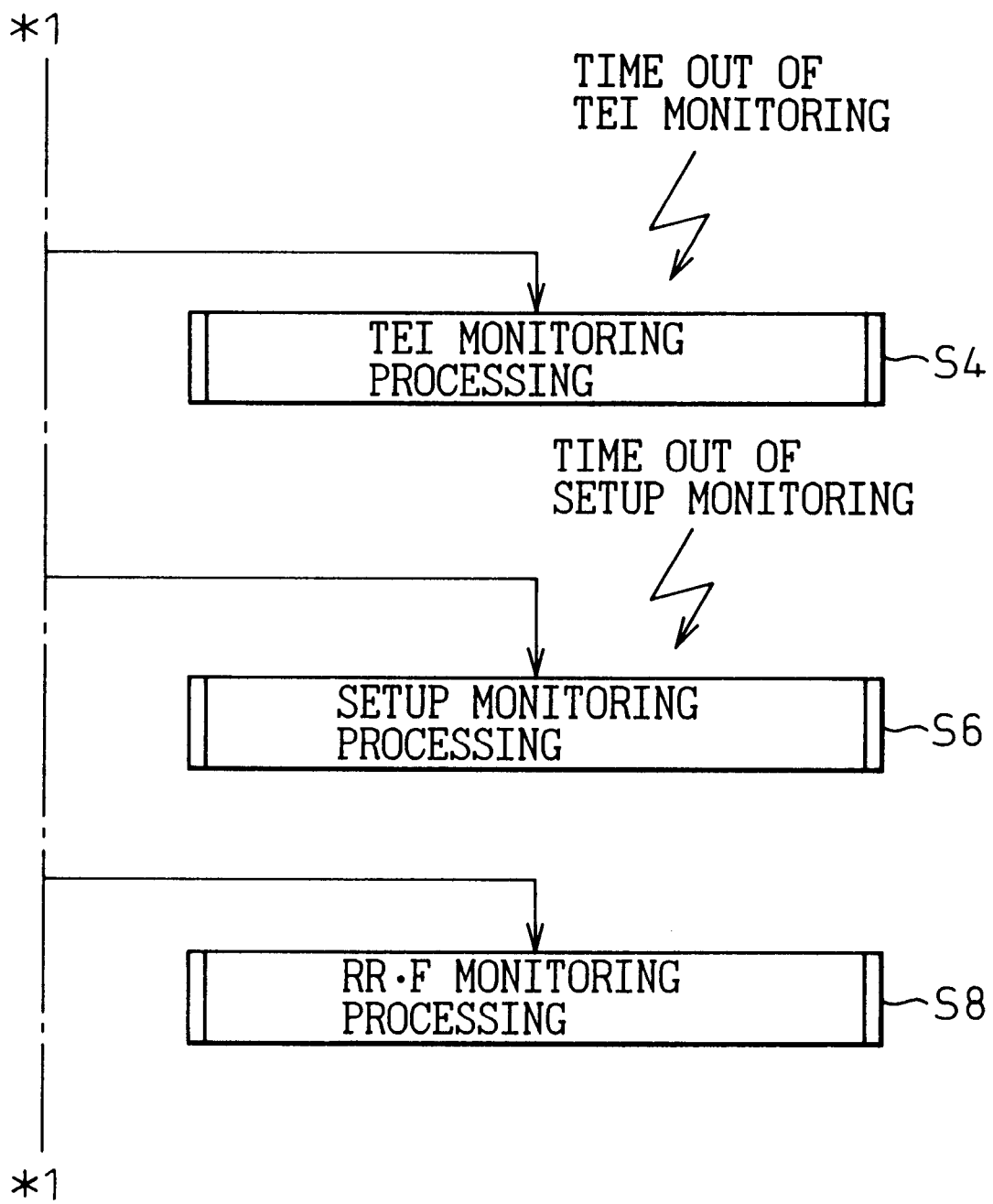

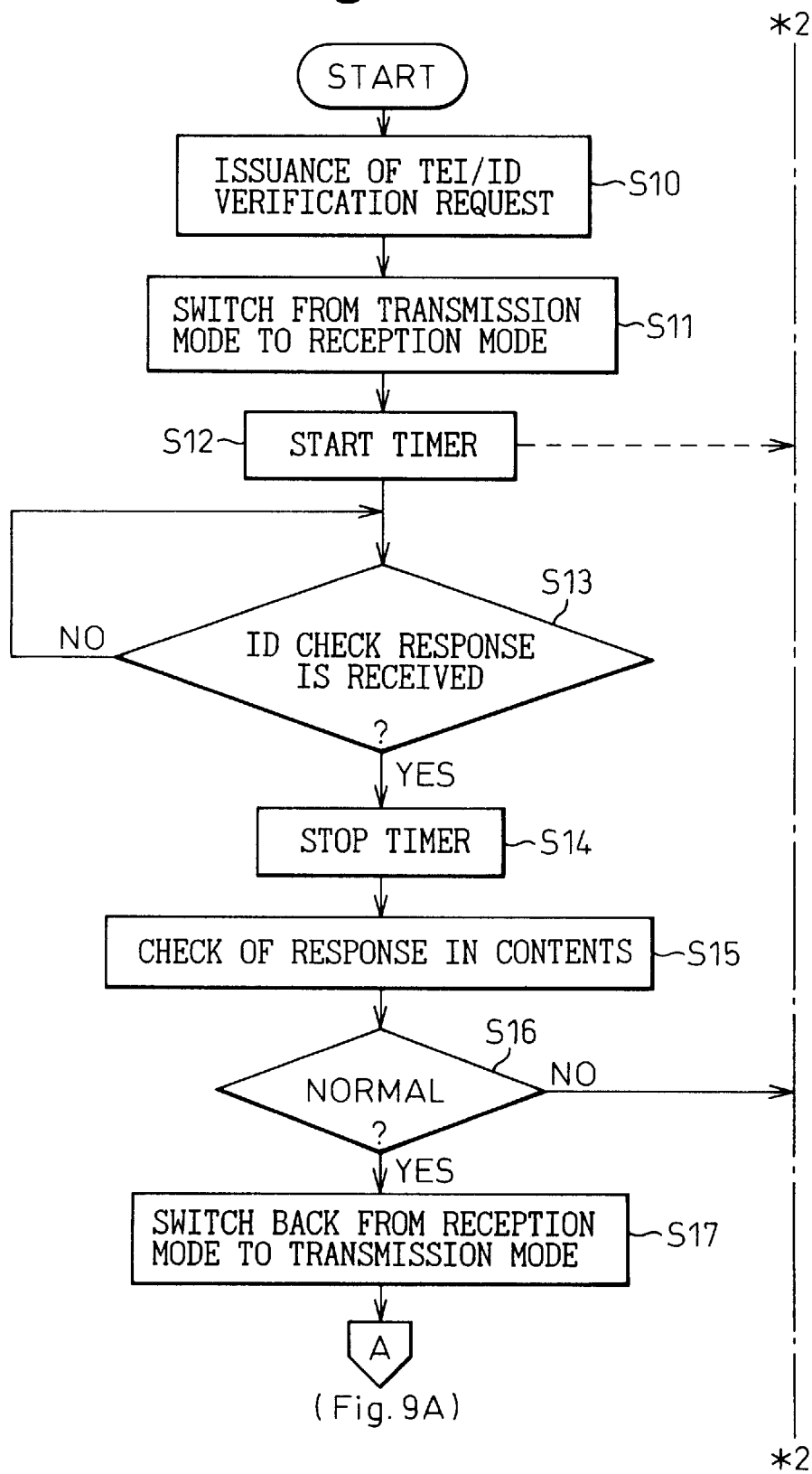

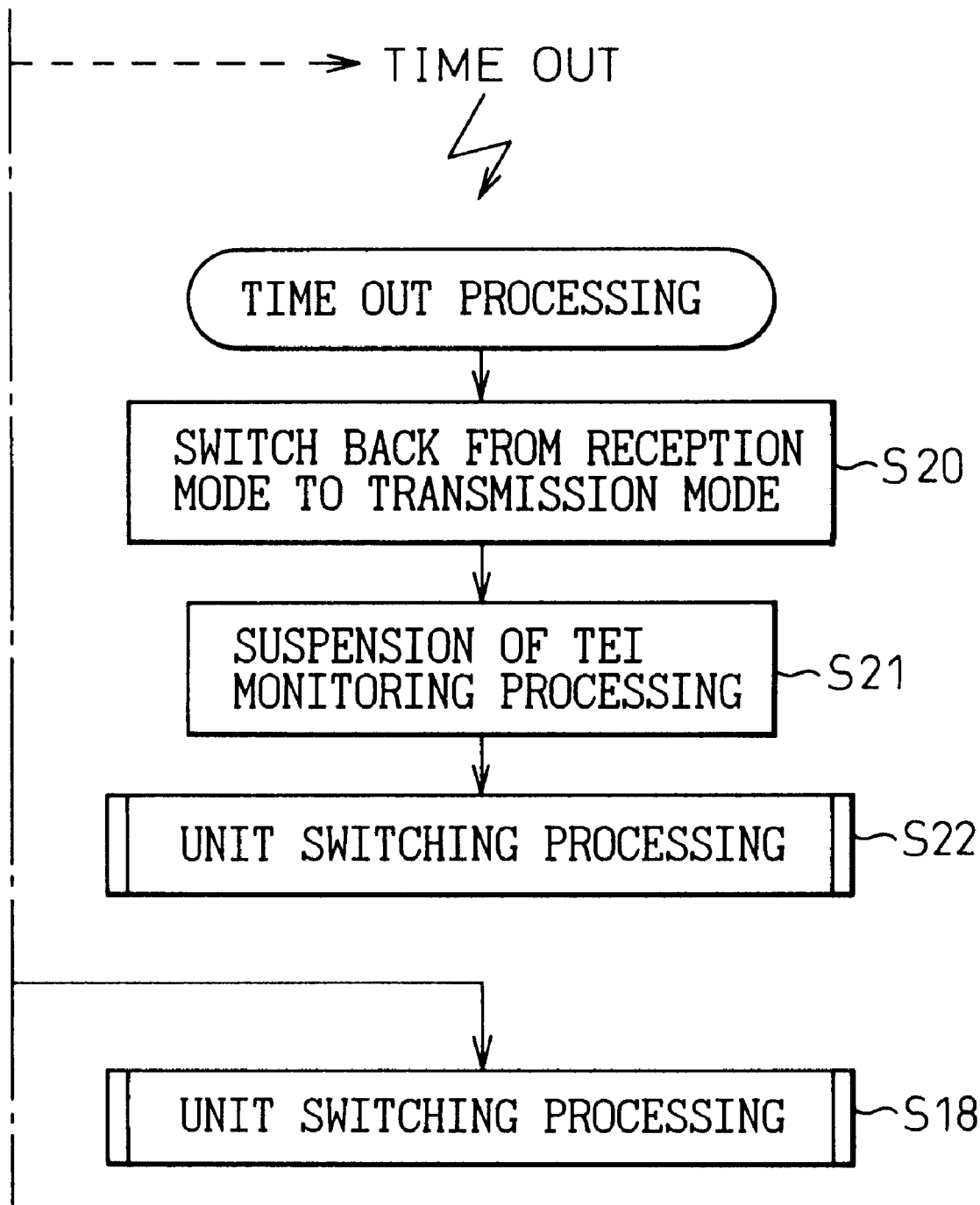

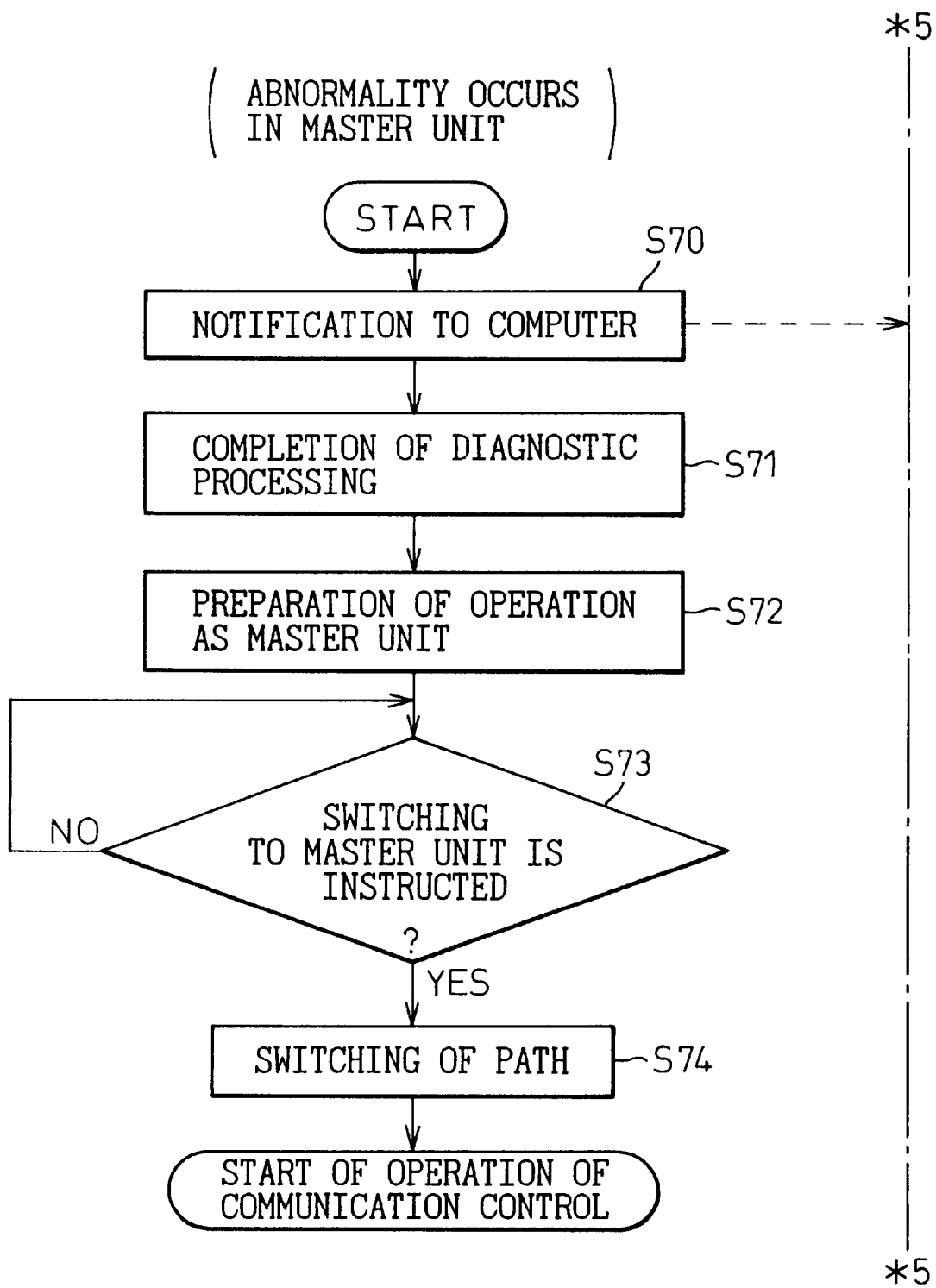

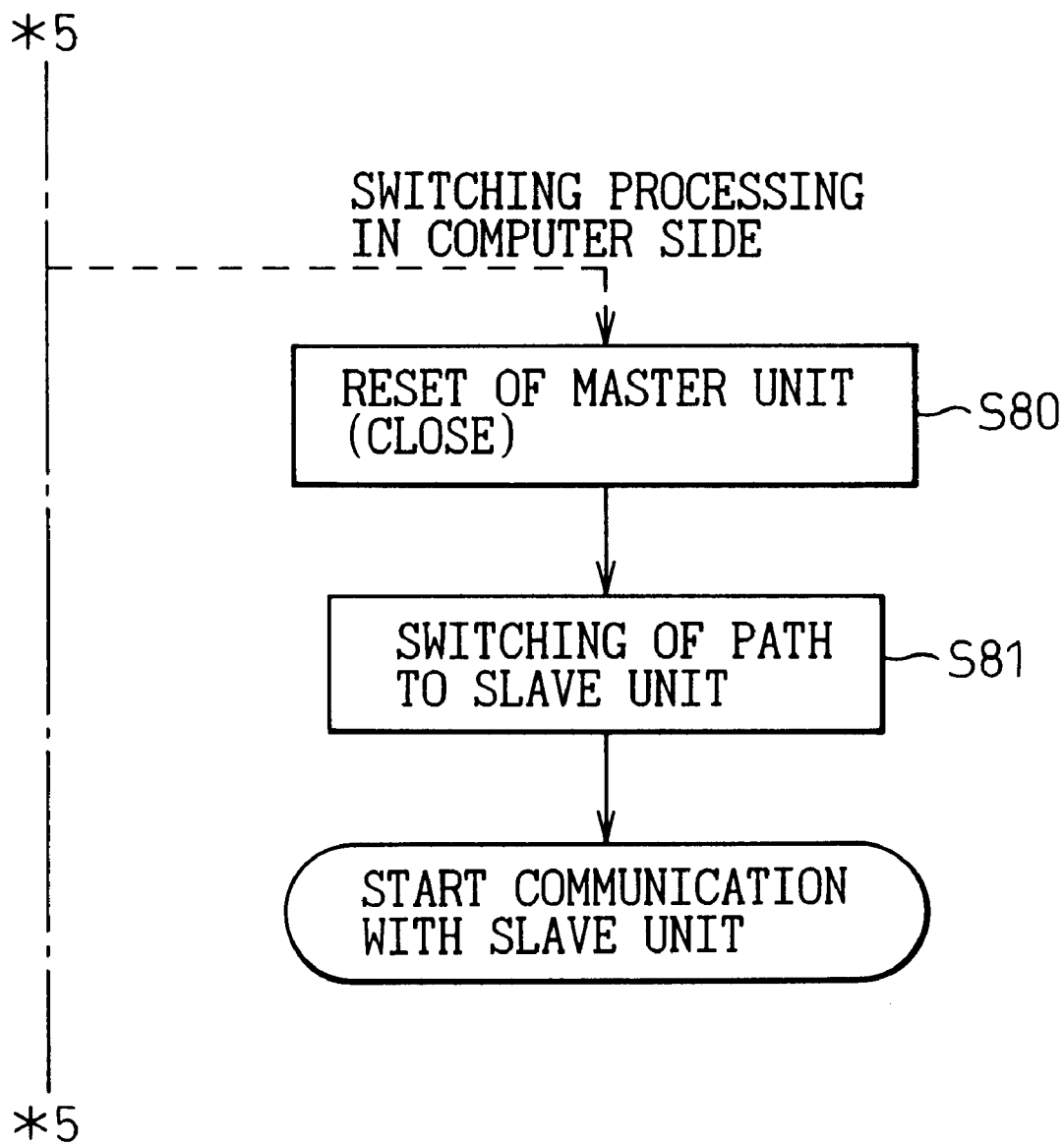

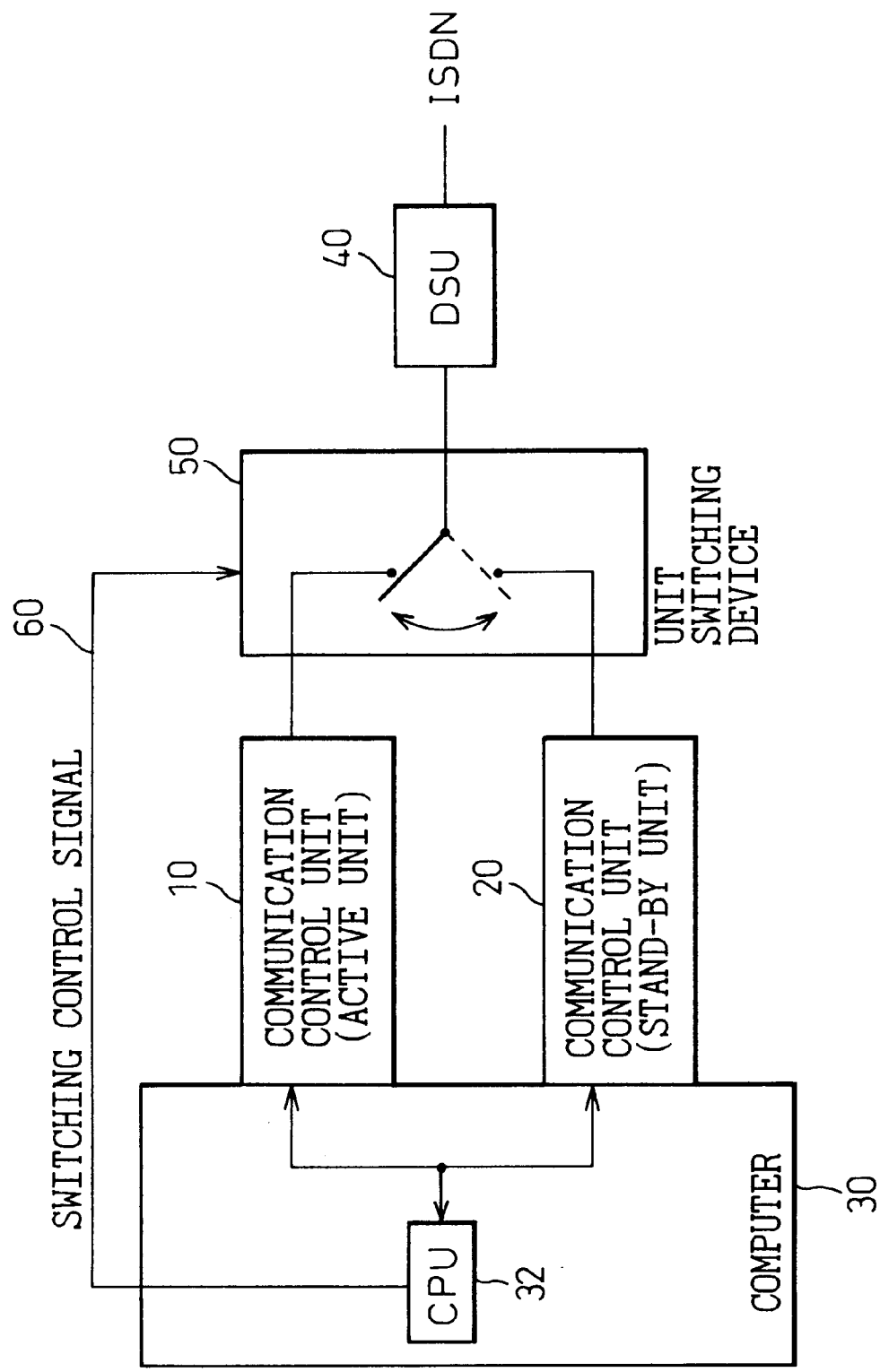

COMMUNICATION CONTROL UNIT SWITCHED BETWEEN ACTIVE AND STAND-BY FUNCTIONS AUTOMATICALLY IN RESPONSE TO MONITORED STATUS OF A DIFFERENT COMMUNICATION CONTROL UNIT CONNECTED TO A COMMON NETWORK

BACKGROUND OF THE INVENTION

1. Field of the Invention

The present invention relates to a communication control unit provided in a computer system for increasing its efficiency, a communication control system consisting of multiplexed communication control units, and a method for switching communication control units.

In general, when an active unit in a duplex configuration of communication control units of a computer system breaks down, the active unit is switched to a stand-by unit based on some sort of error information. It is desirable that the units be switched quickly and without any interruption of the communications.

2. Description of the Related Art

As will be explained in detail later with reference to the drawings, conventional duplex configuration computer systems are provided with an active communication control unit (CCU) and a stand-by communication control unit (CCU) connected with each other in a central processing unit (CPU) in the computer.

In such a computer system, when trying to detect conditions disabling communications for some reason other than hardware abnormalities, the CPU has to use a timer for monitoring or perform polling processing on the active communication control unit so as to detect if the communication control unit fails to make a response or makes an abnormal response.

With monitoring using a timer, however, it is difficult to determine the monitoring time. If the time is set too long, detection of abnormalities will be delayed, while conversely if set too short, a problem occurs of erroneous detection in the middle of processing a large amount of data. Further, when detecting an abnormality by polling processing, there is the problem that the excess load due to the polling processing ends up burdening both the CPU and the active communication control unit. Further, it was not possible to confirm the validity of the communication function itself either with the timer monitoring or the polling processing.

SUMMARY OF THE INVENTION

An object of the present invention is to enable highly reliable communications in the field of high reliability systems having duplexed communication units, in particular, data communication using an ISDN, by switching the duplexed units in a short time when an abnormality occurs and obtaining a grasp of the cause of a breakdown obstructing operation from the condition of the transmission line and making switching conditional on that condition.

To attain the above object, the present invention provides a communication control unit connected to a communication network having an ID verification function and used as either of an active unit and a stand-by unit, provided with a sending device sending an ID verification request to the communication network by an address identifying the other active communication control unit when the unit is used as the stand-by unit; a monitor monitoring if the active communication control unit responds to the ID check request from the communication network; and a switching device switching from the active communication control unit to the stand-by unit and using the latter unit as the active unit without disconnecting the line when the active communication control unit does not return the expected response.

That is, the communication control units are connected in a multidrop configuration and both of the active unit and the stand-by unit are kept activated (communicable in state). The stand-by communication control unit sends a frame through the transmission line at a timing not obstructing the communications, so it is possible to detect an abnormality in the active unit and rapidly switch to the stand-by unit at the time of an abnormality using the unit switching processing device.

BRIEF DESCRIPTION OF THE DRAWINGS

These and other objects and features of the present invention will become more apparent from the following description of the preferred embodiments given with reference to the attached drawings, in which:

FIGS. 2A and 2B are views of examples of the system configuration of the present invention;

FIG. 7 is a view of the processing protocol for monitoring a SETUP;

FIG. 8 is a view of the processing protocol for monitoring an RR frame;

FIGS. 9A, and 9B are flowcharts of the control of a slave communication control unit;

FIGS. 10A and 10B are flowcharts of the processing for monitoring a TEI;

FIGS. 13A and 13B are flowcharts of the unit switching processing; and

FIG. 14 is a view for explaining the related art for duplexing a communication system.

DESCRIPTION OF THE PREFERRED EMBODIMENTS

Figure 1:
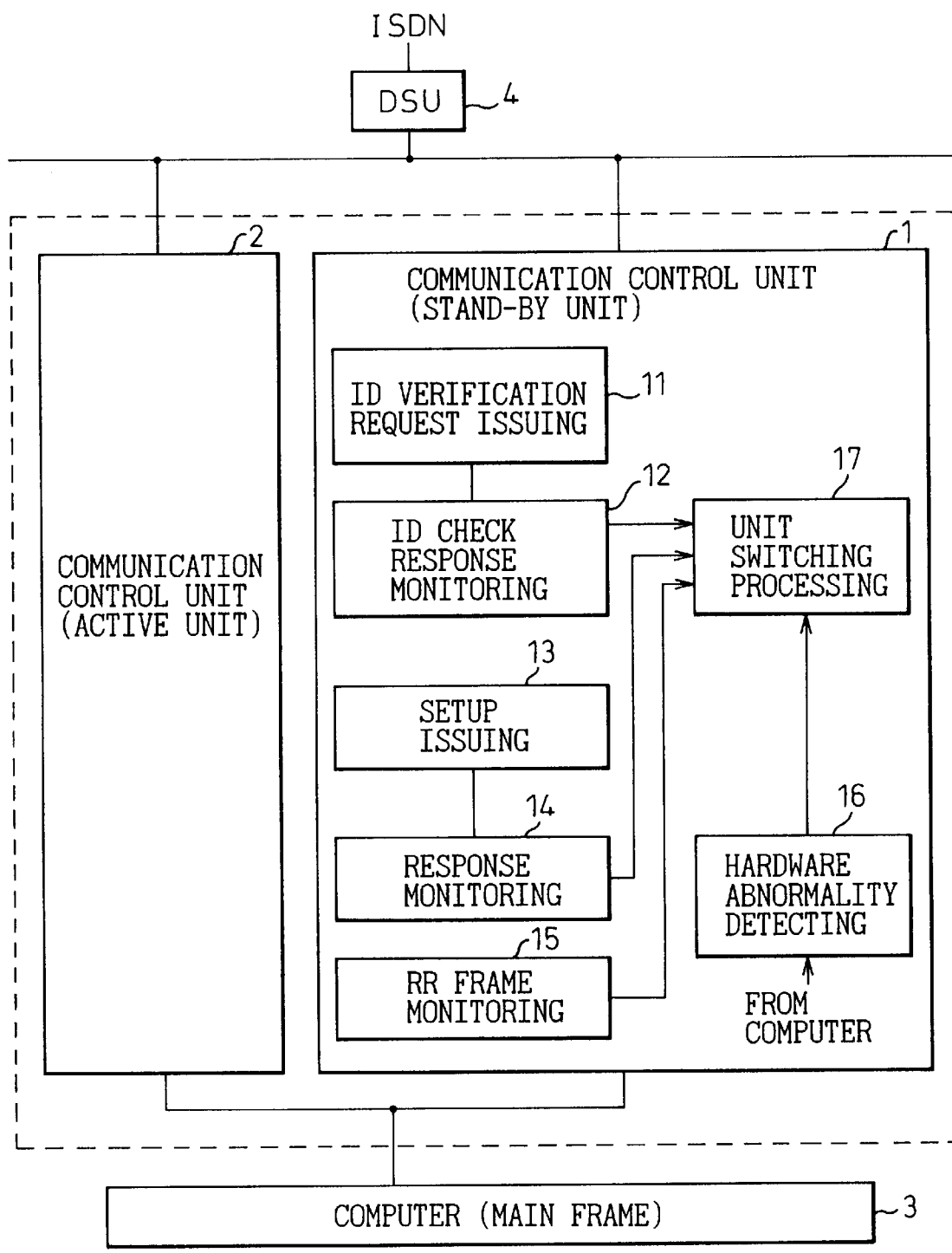
FIG. 1 is a block diagram of an example of the configuration of the present invention.

Before describing the embodiments of the present invention, the related art and the disadvantages therein will be described with reference to the related figures.

FIG. 14 is a view explaining the related art in a duplex configuration of a communication system.

To make a communication system duplex in configuration, in the past, active and stand-by communication control units 10, 20 were connected to a central processing unit (CPU) 32 in a computer mainframe 30.

Normally, the processing for the communication is performed by the active communication control unit 10. The path to a digital service unit (DSU) 40 is connected to the ISDN through the unit switching device 50. The CPU 32 in the computer mainframe 30 monitors the status of the communication control unit 10 and, when detecting an abnormality in the hardware or a failure of response, connects the stand-by communication control unit 20 to the ISDN sending a switching control signal 60 to the unit switching device 50 which restarts the communication using the communication control unit 20 as the active unit. "Failure of response" means when the communication control unit 10 fails to return a response to a request from the CPU 32.

Here, the problem is that when trying to detect conditions disabling communications for some reason other than hardware abnormalities, the CPU 32 has to use a timer for monitoring or perform polling processing on the communication control unit 10 of the active unit so as to detect if the communication control unit 10 fails to respond or makes an abnormal response.

With monitoring using a timer, however, it is difficult to determine the appropriate duration of the monitoring time. If the time is set too long, detection of abnormalities will be delayed, while conversely if set too short, a problem occurs of erroneous detection in the middle of processing a large amount of data. Further, when detecting an abnormality by polling processing, there is the problem that the excess load due to the polling processing ends up burdening both the CPU 32 and the active communication control unit 10. Further, it was not possible to confirm the validity of the communication function itself either with the timer monitoring or the polling processing.

The present invention provides a computer system which enables highly reliable communications in the field of high reliability systems having duplexed communication units, in particular, data communication using an ISDN, by switching the duplexed units in a short time when an abnormality occurs and obtaining a grasp of the cause of a breakdown obstructing operation from the condition of the transmission line and making switching conditional on that condition.

The present invention has as its most important feature, the provision of a device connecting the communication control units in a multidrop configuration, keeping both of the active unit and the stand-by unit activated (communicable in state), and having the stand-by communication control unit transmit a frame through the transmission line at a timing not obstructing the communications, and thereby to enable detection of an abnormality in the active unit and rapid switching to the stand-by unit at the time of an abnormality.

FIG. 1 is a block diagram of an example of the configuration of the present invention.

In the figure, reference numerals 1 and 2 are duplexed communication control units performing processing for communication. In particular, reference numeral 1 shows the stand-by communication control unit and reference numeral 2 the active communication control unit. Reference numeral 3 is a computer (mainframe) for communicating with another apparatus for processing data, while reference numeral 4 is a digital service unit (DSU).

The communication control unit 1, when used as the stand-by unit, is provided with an ID verification request issuing device 11 issuing an ID verification request to the ISDN or other communication network by an address identifying the active communication control unit 2, an ID check response monitoring means 12 for monitoring if the active communication control unit 2 responds to an ID check request from the communication network, and a unit switching processing device switching from the active communication control unit 2 to the stand-by unit and using the stand-by unit as the active unit without disconnecting the line when it is found as a result of the monitoring that the active communication control unit 2 fails to return the expected response.

Further, the communication control unit 1, when used as the stand-by unit, is provided with a hardware abnormality detecting device 16 detecting an abnormality in the hardware of the active communication control unit 2 and has the function of separating the active communication control unit 2 from the bus of the computer 3 by the unit switching processing device 17 and using the stand-by unit as the active unit when detecting an abnormality in the hardware.

Further, the communication control unit 1, when used as the stand-by unit, is provided with a SETUP issuing device 13 sending a SETUP, not matching in high layer compatibility, to the active communication control unit 2 and a response monitoring device 14 monitoring whether the communication control unit 2 responds to the SETUP and has the function of switching from the active communication control unit 2 to the stand-by unit by the unit switching processing device 17 and using the stand-by unit as the active unit when the active communication control unit 2 fails to make a suitable response.

Further, the communication control unit 1, when used as the stand-by unit, is provided with an RR frame monitoring device 15 monitoring a response to a reception ready (RR) frame in a signal link from the active communication control unit 2 and having a function of switching from the active communication control unit 2 to the stand-by unit by the unit switching processing device 17 and using the stand-by unit as the active unit when the active communication control unit 2 fails to make a suitable response to the RR frame.

The communication control unit 2 is provided with a circuit (not shown here) for switching between transmission and reception modes, to guide transmission information of the communication control unit 2 to be sent to the communication network to a reception circuit for receipt as reception information from the communication network so as to enable the ID check response monitoring means 12, the response monitoring device 14, or the RR frame monitoring device 15 to monitor a response, etc., of the active communication control unit 2.

By multiplexing the communication control unit 1 and the communication control unit 2 in advance and accommodating a plurality of the same in a single casing or mounting a plurality of the same on a single board, it becomes possible to assemble and/or install the multiplexed communication control units easily and in a small space.

Note that in FIG. 1, a communication control unit 2 used as the active unit is also sometimes used as a stand-by unit, so it has components similar to those of the communication control unit 1.

Figure 2A:
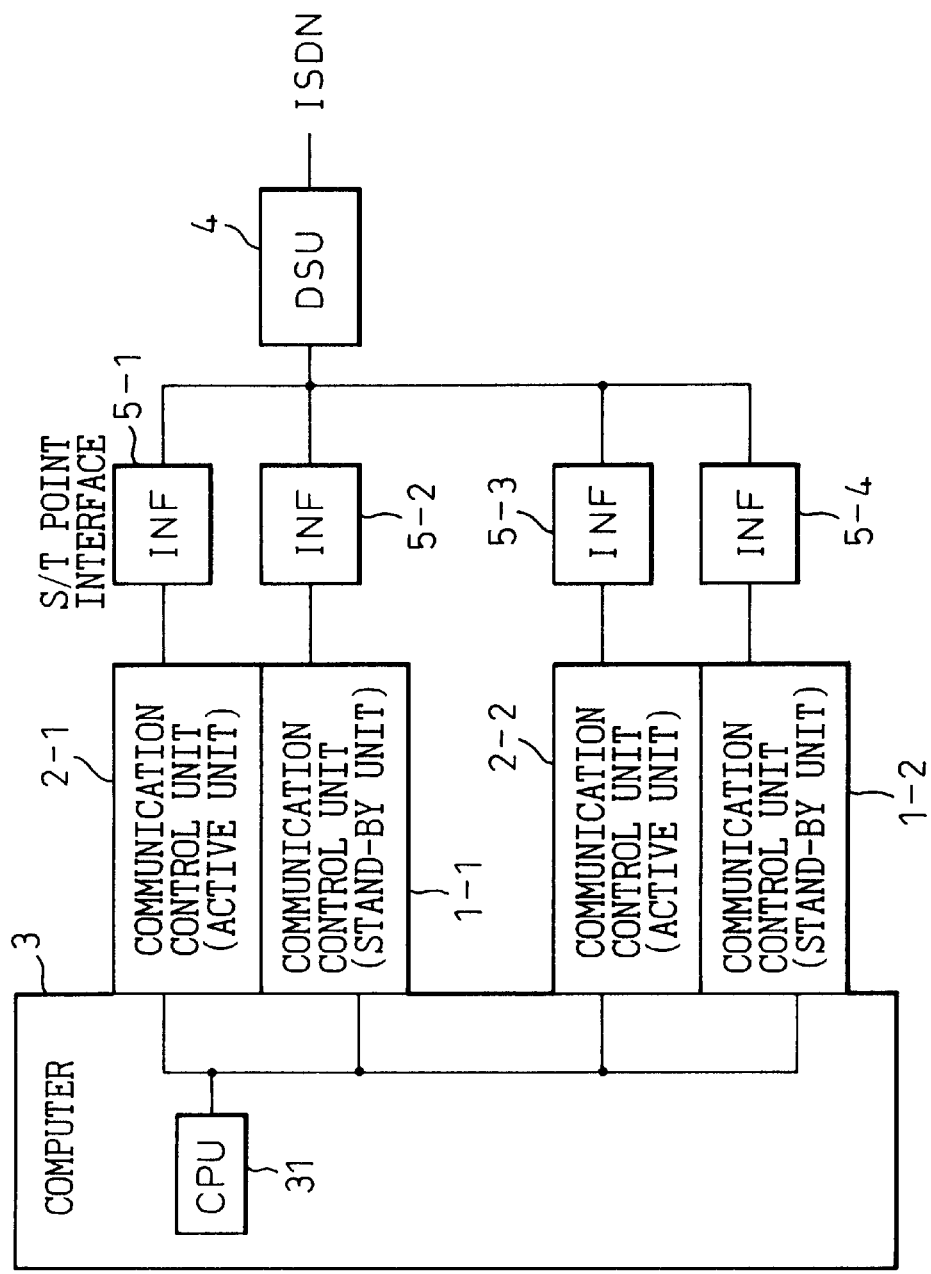

FIGS. 2A and 2B are view of examples of the system configuration of the present invention.

FIG. 2A is an example of a disposition of an active unit and a stand-by unit in a 1-to-1 configuration. Active communication control units 2-1 and 2-2 and stand-by communication control units 1-1 and 1-2 are connected to a CPU 31 in the computer 3. When the communication control unit 2-1 starts operating abnormally, the communication control unit 1-1 is switched to be the active unit. When the communication control unit 2-2 starts operating abnormally, the communication control unit 1-2 is switched to be the active unit. The S/T point interfaces (INF) 5-1 to 5-4 are interfaces with the communication control units and the DSU 4.

FIG. 2B is an example of a disposition of active units and a single stand-by unit in an N-to-1 configuration (N=2 in this case), where the stand-by communication control unit 1 monitors both of the active communication control units 2-1 and 2-2 and, when detecting an abnormality in either of the units (2-1 and 2-2), switches with that abnormal unit and becomes the active unit.

Below, an explanation will be made of the case where the communication control unit 2 is used as the active unit (master system) and the communication control unit 1 is used as the stand-by unit (slave system).

This embodiment uses the ISDN TEI management protocol, which is based on the CCITT Series Q (Series I 1984) 1988 recommendations, so as to enable the stand-by communication control unit 1 to confirm if the active communication control unit 2 is operating normally.

Figure 3:
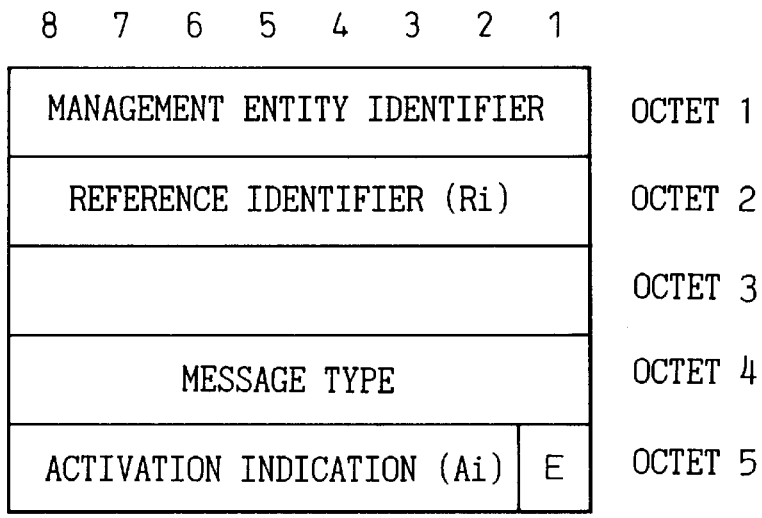
FIG. 3 is a view of the data structure of a message used for a TEI management protocol.

FIG. 3 is a view of the data structure of a message used for the TEI management protocol.

The TEI, or "terminal end point identifier", is an address enabling the network or user terminal (CCU) to identify itself and is acquired from the network in advance. The message used for the TEI management protocol is transferred with a service access point identifier (SAPI) value of 63 and a TEI value of 127 set in the information fields of the unnumbered information (UI) command. All of the messages are structured the same as the structure shown in FIG. 3. The values or the range of values of the fields are decided upon in advance in accordance with the messages. Unused fields are all coded as 0. "E" is an expansion bit of the activation indication field.

The active communication control unit 2 acquires a TEI when starting the communication, but at this time the reference identifier, i.e., the Ri value, of the communication control unit 2 is obtained from the computer 3. At this time, this information is also given to the stand-by communication control unit 1. If the operation of the active unit for acquiring the TEI is performed on the transmission line, the stand-by unit monitors the data on the transmission line and stores the information, which the active unit acquired, in the local memory in the communication control unit 1. After this, it monitors the frames having this value as being related to the active unit.

Figure 4:
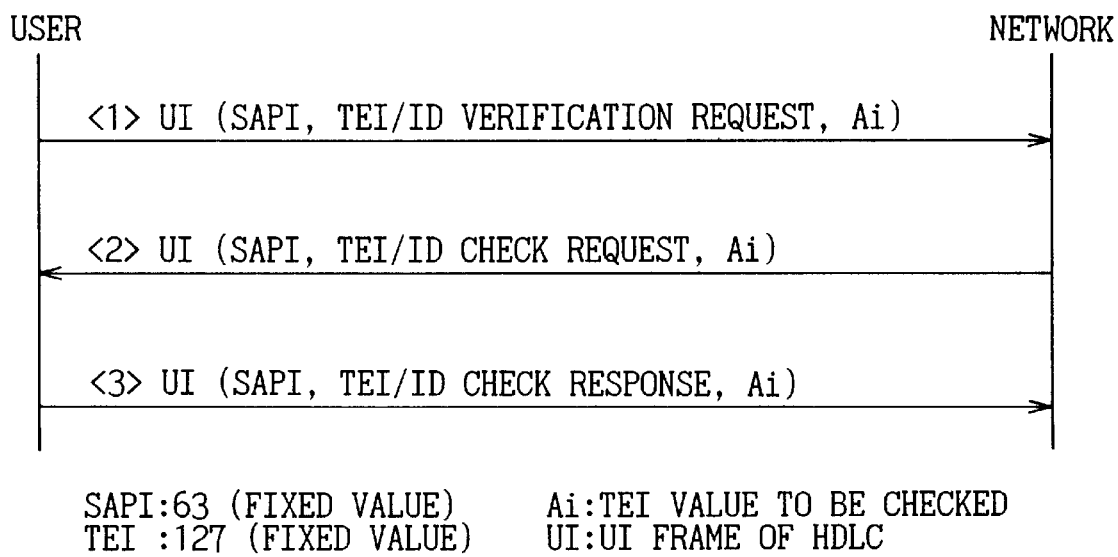
FIG. 4 is a view of the processing protocol for monitoring a TEI.

FIG. 4 is a view of the processing protocol for monitoring the TEI.

The stand-by communication control unit 1 counts a predetermined time by a timer etc. When the time elapses, it sends a TEI/ID verification request to the network (ISDN) to prompt a TEI/ID check request. The protocol of the TEI verification is defined so that the network requests from the terminal a response on whether the terminal (CCU) is operating normally with the acquired TEI value as it is and the TEI value sent from the terminal is checked to judge its legitimacy. In this embodiment, this sequence is generated by the stand-by communication control unit 1 and used for checking if the active unit is operating normally. That is, the stand-by communication control unit 1 monitors if the active unit responds correctly to a TEI/ID check request based on the TEI value of the active unit.

If the active unit responds normally, similar monitoring is continued after the elapse of a predetermined time. If the active unit does not respond correctly, a predetermined number of retries are attempted. When the number of retries run out, the computer 3 is notified of switching of the stand-by unit/active unit and the communication control unit continues the communication as the active unit. The computer 3 removes what had been the active communication control unit 2 from the active system and operates using the communication control unit 1. At this time, if there is another communication control unit which can be used as the stand-by unit in the computer system, the TEI value is read from the communication control unit 1 and given to that communication control unit. By this, the monitoring operation of the communication control unit 1 is started.

The above sequence will be explained with reference to <1> to <3> shown in FIG. 4.

In this embodiment, the TEI/ID verification request normally sent by the active unit is set by the stand-by unit to the network. The stand-by unit sets the TEI value of the active unit to be checked in the activation indication field Ai in the UI frame.

The network sends a TEI/ID check request to the user terminal (CCU).

Receiving the TEI/ID check request from the network if the active unit is normal, the active unit sets the TEI value which it uses itself in the activation indication field Ai of the UI frame and returns the TEI/ID check response to the network.

The stand-by unit can check if the active unit is operating normally by monitoring the responses of the active unit to the network.

Figure 5:
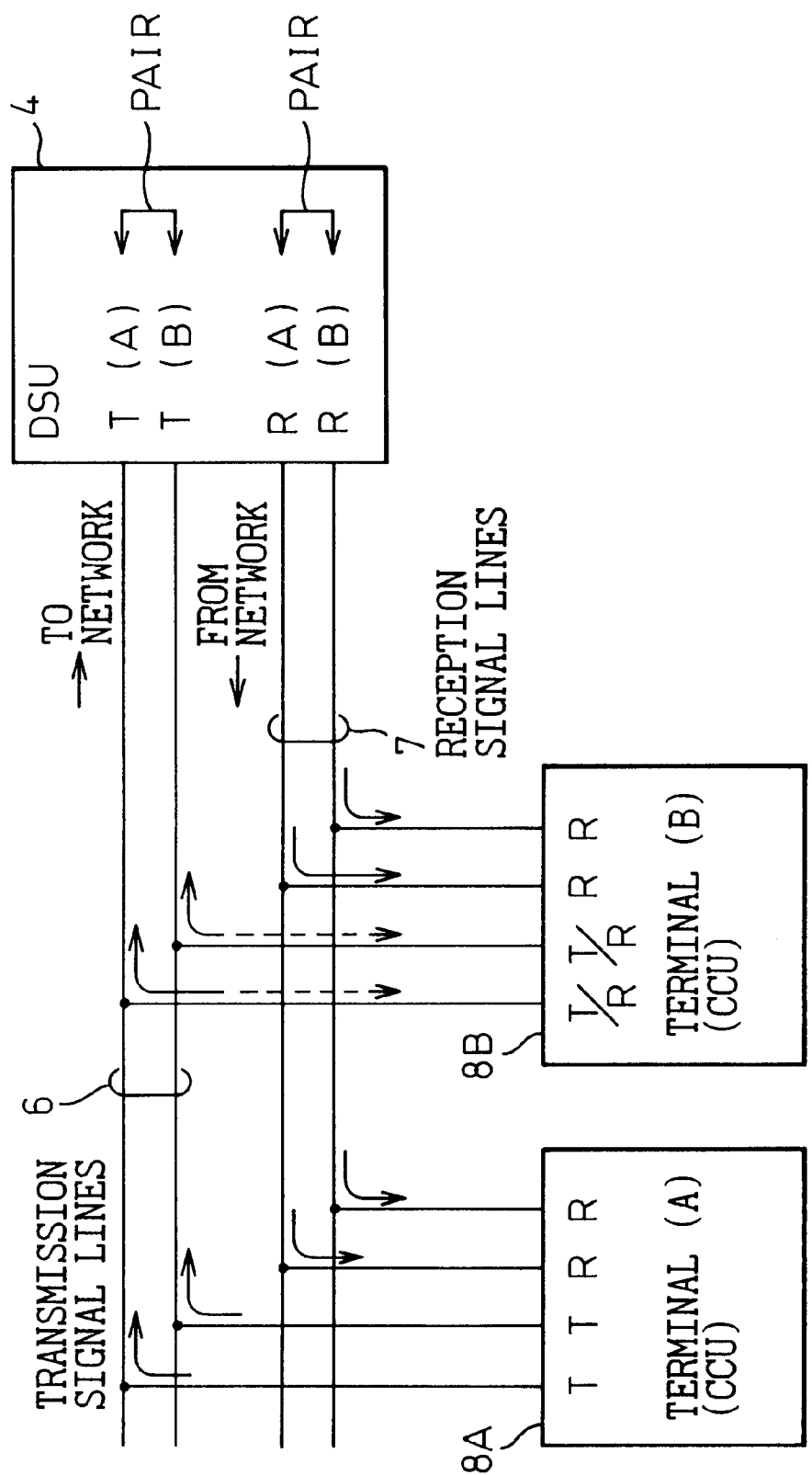
FIG. 5 is a view of an example of the configuration of the connection of a terminal (CCU)
Figure 6:
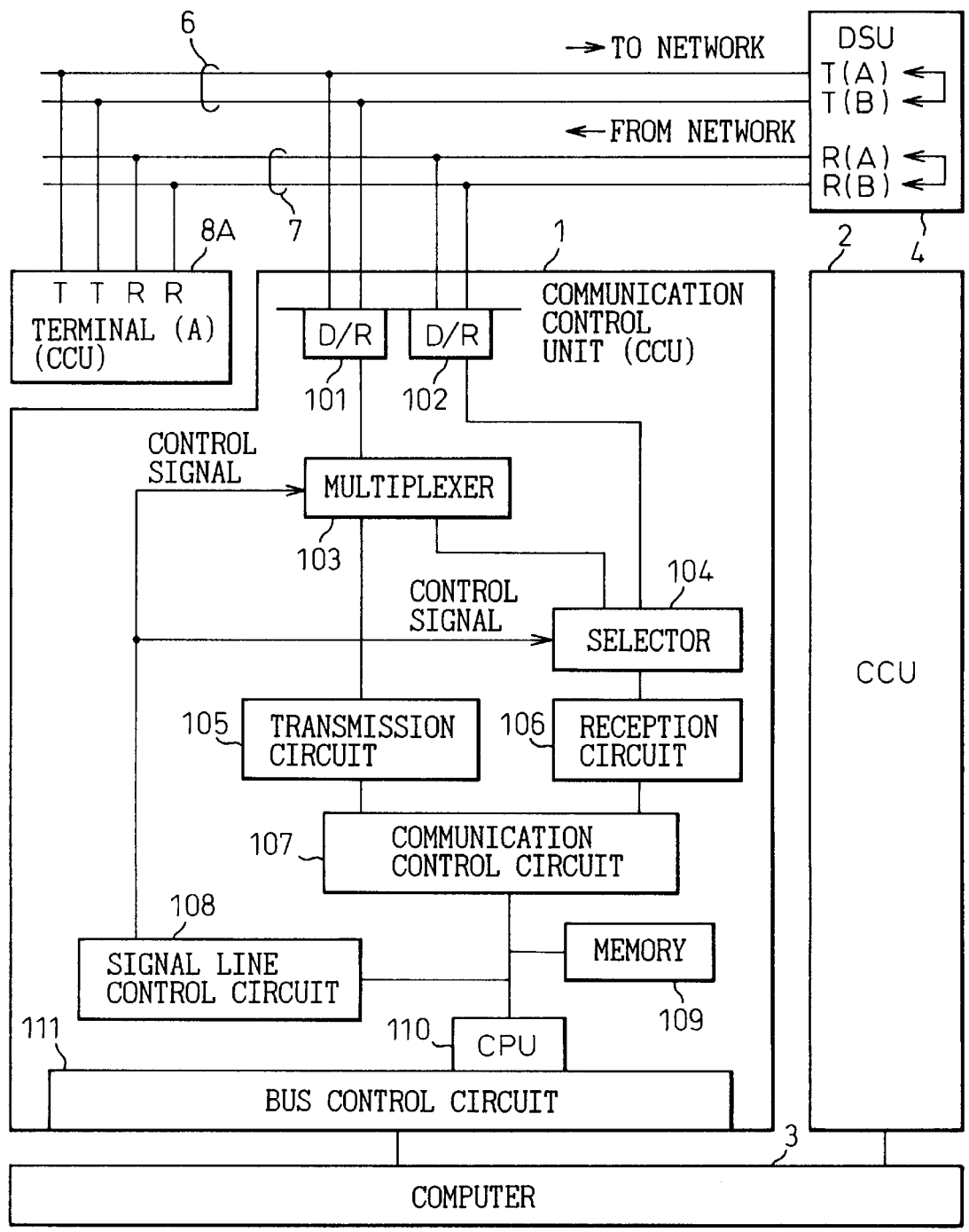
FIG. 6 is a view of an example of the internal configuration of a communication control unit.

FIG. 5 is a view of an example of the configuration of the connection of a terminal (CCU), while FIG. 6 is a view of an example of the internal configuration of a communication control unit.

However, when a plurality of terminals (CCUs) 8A and 8B are connected to the DSU 4, as shown in FIG. 5, they are connected to the transmission signal lines 6 (T) to the network and the reception signal lines 7 (R) from the network. As is clear from this figure, in general, the terminal 8B cannot receive the data sent by the terminal 8A. That is, the terminals 8A and 8B can only receive data from the reception signal lines 7, so the data (on T) sent by the terminal 8A to the network cannot be received by the terminal B. Therefore, the terminal 8A and terminal 8B cannot communicate on the transmission line.

The active unit and the stand-by communication control units are also connected in the same way as explained above, but in this case, in a general configuration of connection, the stand-by communication control unit 1 cannot receive the frame of the TEI/ID check response which the active communication control unit 2 sends. Therefore, as shown in FIG. 6, the communication control unit 1 is provided with multiplexer 103, a selector 104, and a signal line control circuit 108. When the communication control unit 1 monitors the frame sent by the active communication control unit 2, a control signal is used to control the multiplexer 103 and selector 104 so as to guide the data of the transmission signal lines 6 through the multiplexer 103 and the selector 104 to the reception circuit 106.

Note that in FIG. 6, reference numerals 101 and 102 indicate driver/receivers, 105 a data transmission circuit, 106 a data reception circuit, 107 a communication control circuit for controlling the transmission and reception of data, 108 a signal line control circuit for controlling the switching of the multiplexer 103 and the selector 104, 109 a memory in the communication control unit 1, 110 a CPU for executing a program for control of the communication, and 111 a bus control circuit for controlling the bus for communication with the computer 3. The communication control unit 2 is configured similarly to the above and is connected to both of the transmission signal lines 6 and the reception signal lines 7.

The signal line control circuit 108 decides, based on the control signal input from the CPU 110, whether to transmit data to the transmission signal lines 6 in the transmission line or to input the data on the transmission signal lines 6 as reception data to the reception circuit 106.

It is possible to confirm that the active unit is operating normally not only when having the stand-by communication control unit monitor the TEI sequence, but also when having it monitor the reception sequence or the response of the data link level.

FIG. 7 is a view of the processing protocol for monitoring the SETUP.

Here, whether the active unit is operating normally is confirmed by the stand-by unit sending an invalid SETUP (origination sequence). TEI is the address for enabling the network and user terminal (CCU) to identify themselves and is obtained in advance from the network. In this example, TEI is assumed to be 16. The sequence for the processing for monitoring the SETUP is as shown in <1> to <3> shown in FIG. 7.

In this embodiment of the present invention, the SETUP (origination sequence) which is normally sent by the active unit to the network is sent by the stand-by unit. The high layer compatibility information is set with attributes which do not coincide with the attributes of the active unit. For example, if the active unit is a data terminal, a different attribute, such as it being a facsimile terminal, is set. In this case, to prevent other equipment which is connected in a multidrop configuration from being affected, a subaddress of the active unit is set in the transmission address. That is, the address of the active unit is set in the termination address and termination subaddress in the SETUP.

The network sends a UI frame containing high layer compatibility information which would be judged abnormal, due to a difference of attributes, to the user (terminal).

The active unit, receiving the UI frame, returns a release (REL) response to the network since it judges that there is an abnormality in the high layer compatibility.

The stand-by unit can check if the active unit is operating normally by monitoring the REL response of the active unit to the network. In this case, the content of the REL frame is also checked. The method of fetching the data in the stand-by unit is similar to the case of the TEI/ID check explained with reference to FIG. 6.

FIG. 8 is a view of the processing protocol for monitoring an RR frame.

In the above example, whether the active unit was operating normally was confirmed by sending data, not directly related to the operation, to the transmission line. Instead of this, however, it is also possible to confirm whether the active unit is operating normally by monitoring whether the active unit correctly responds to a RR-P frame in a signal link from the network. This will be explained below in accordance with the sequences <1> and <2> shown in FIG. 8.

Assume that an RR-P frame in a D-channel signal link designating the TEI of the active unit, for example 16, arrives from the network (ISDN).

If the active communication control unit 2 is operating normally, it returns an RR-F frame with respect to the RR-P frame.

The stand-by unit monitors the response of the active unit to the network and checks if the active unit is operating normally or not. The method of fetching data in the stand-by unit is the same as the case of the TEI/ID check explained with reference to FIG. 6.

In the above, whether the active communication control unit 2 was operating normally was confirmed by monitoring the responses of the active unit to the network; however, it is also possible to switch between the active unit and the stand-by unit by a notification of the fact of detection of an abnormality in the active unit from the computer 3.

Figure 9A:
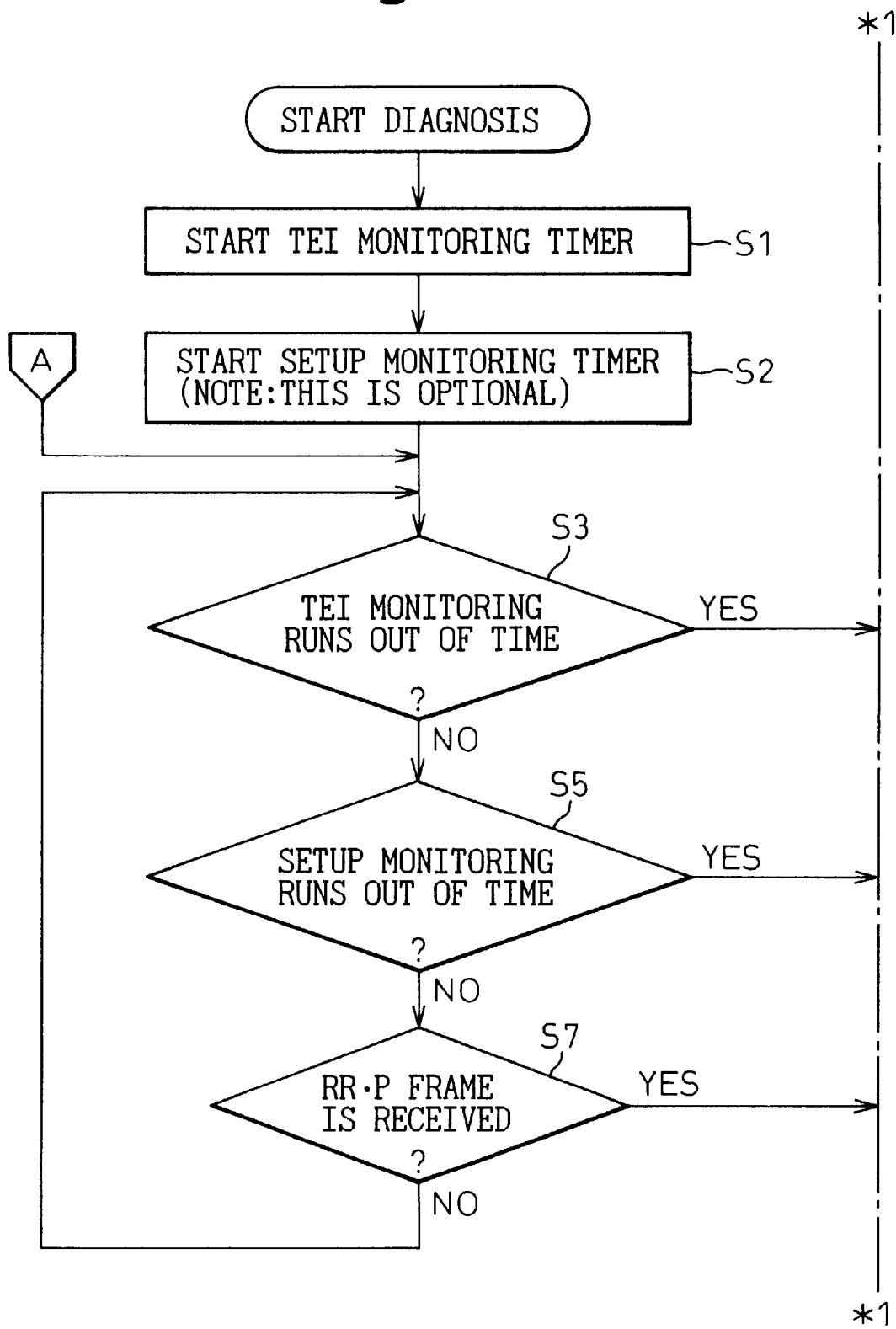
Figure 11A:
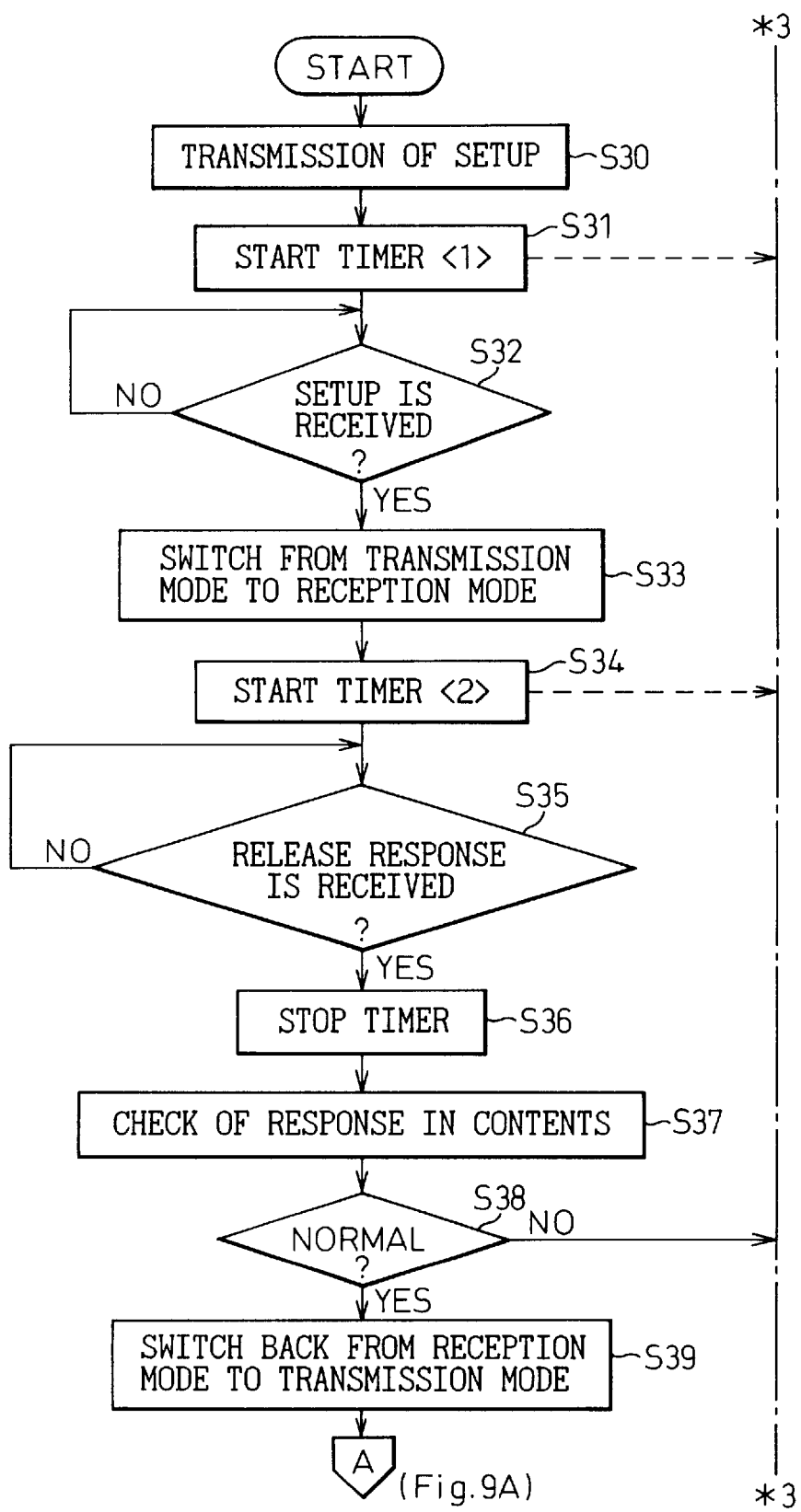
FIGS. 11A and 11B are flowcharts of the processing for monitoring a SETUP.
Figure 11B:
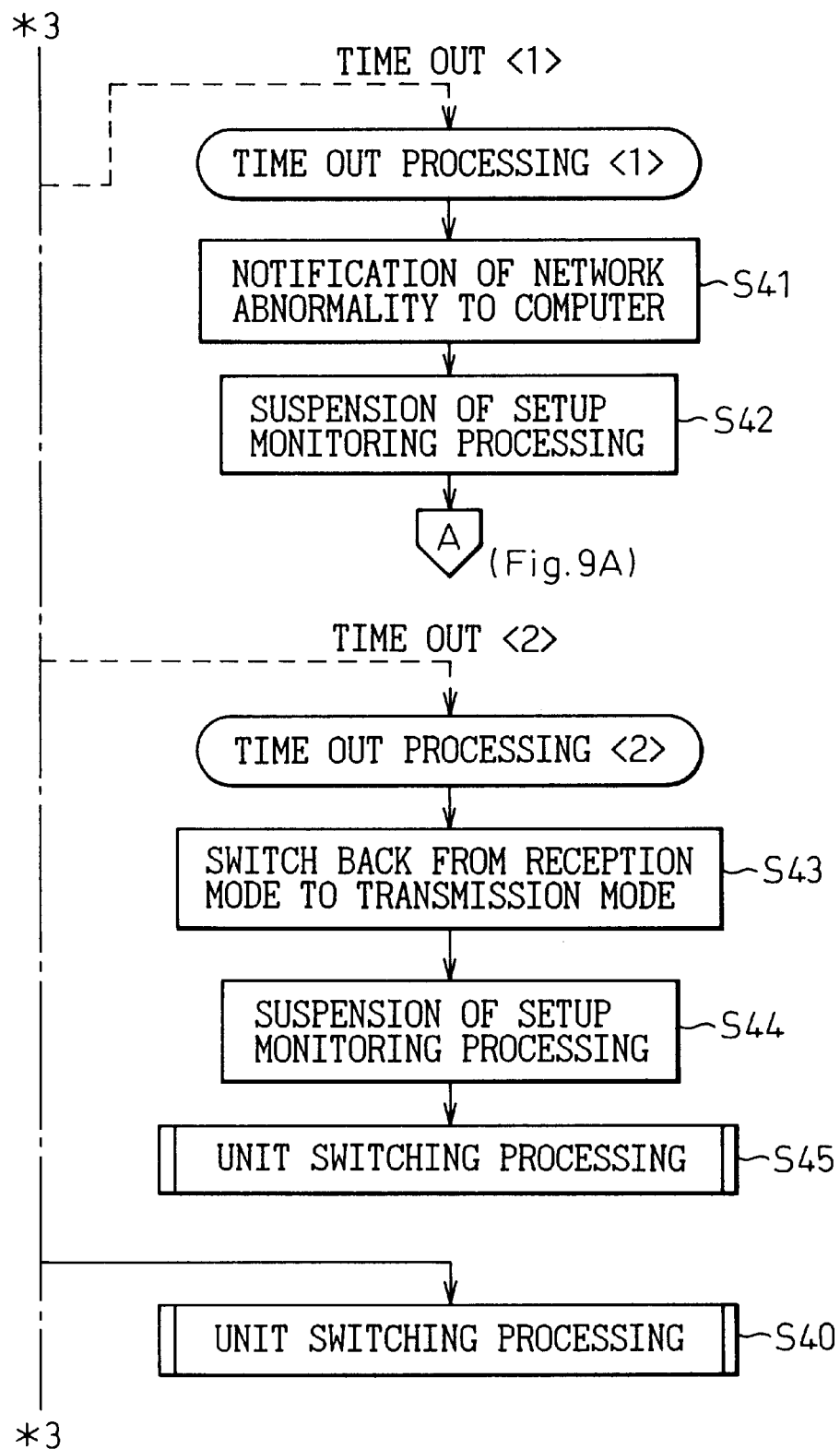
Figure 12A:
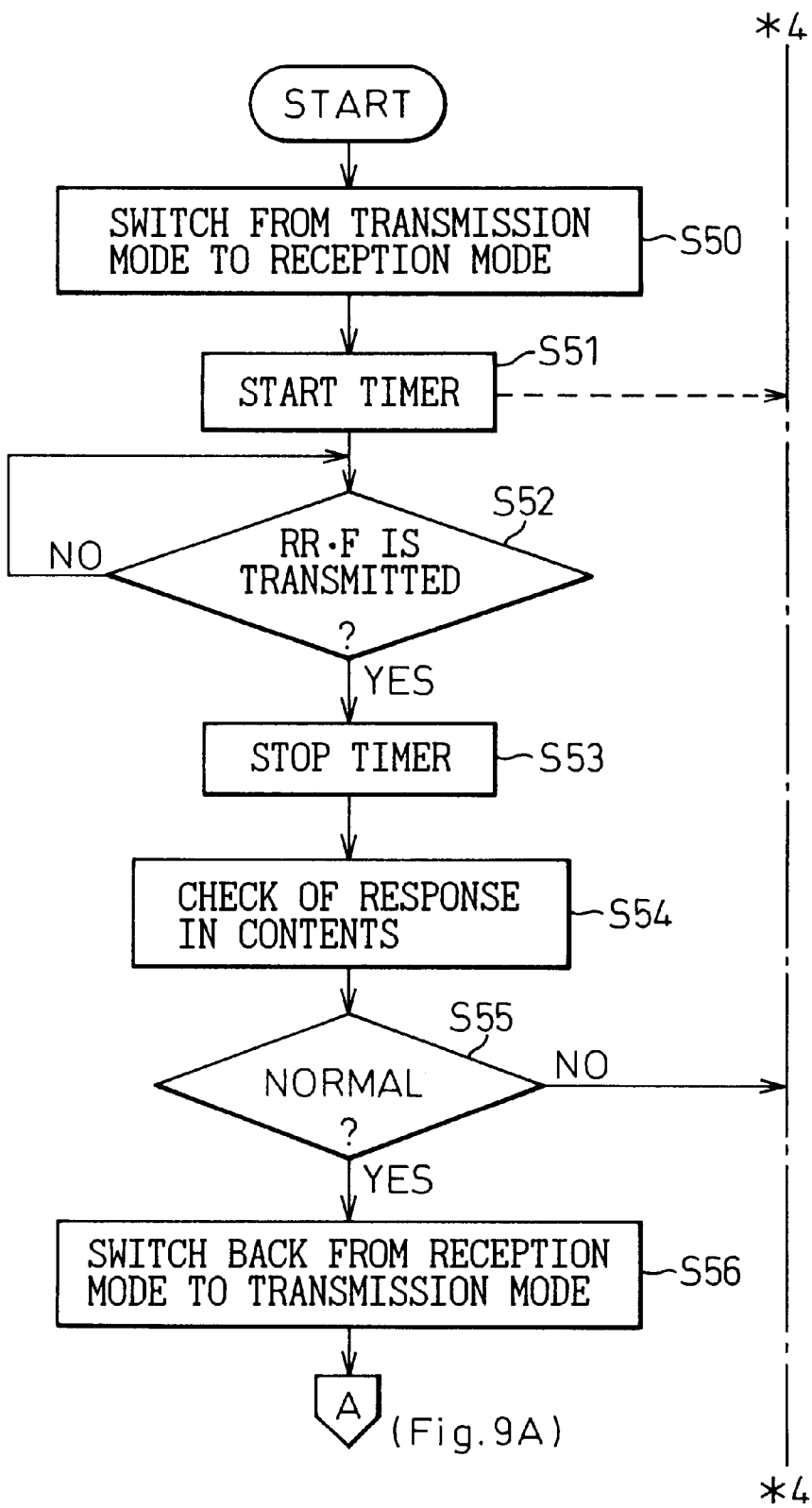
FIGS. 12A and 12B are flowcharts of the processing for monitoring an RR frame.
Figure 12B:
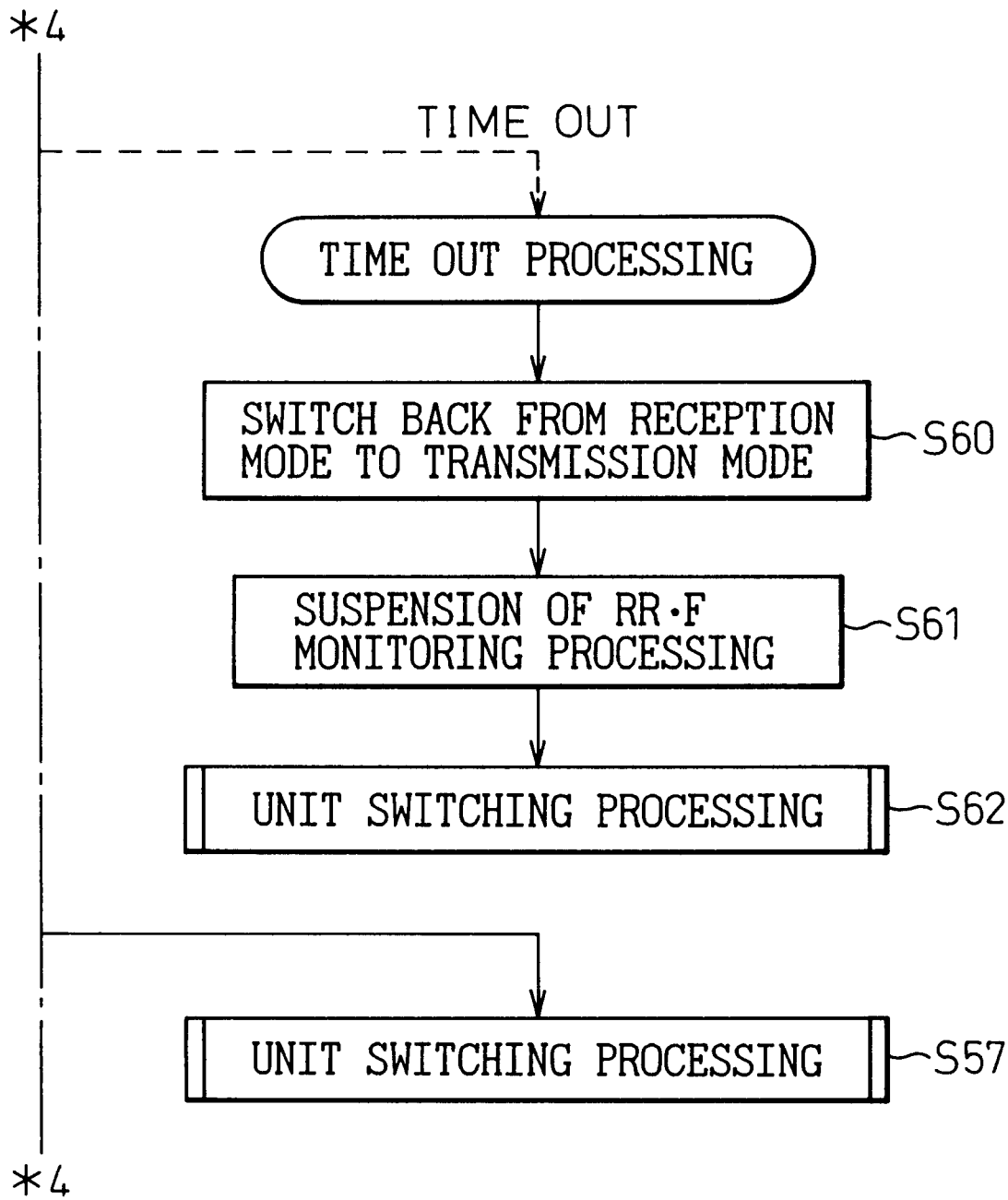

FIGS. 9A, and 9B are flowcharts of the control of a slave communication control unit, FIGS. 10A and 10B are flowcharts of the processing for monitoring the TEI; FIGS. 11A and 11B are flowcharts of the processing for monitoring the SETUP; FIGS. 12A and 12B are flowcharts of the processing for monitoring the RR-F frame; and FIGS. 13A and 13B are flowcharts of the processing for switching units.

Below, an explanation will be made of the case of use of the stand-by communication control unit 1 as the slave unit and the active communication control unit 2 as the master unit.

The stand-by communication control unit 1, when starting the diagnosis of the active unit, starts the TEI monitoring timer for obtaining the timing of the TEI/ID verification request, explained in FIG. 4, from step S1 shown in FIG. 9A. Further, at step S2, it starts the SETUP monitoring timer for obtaining the timing of the transmission of the SETUP explained in FIG. 7. Note that the activation of the SETUP monitoring is optional. Step S2 is executed only in systems which select this option in advance.

If the predetermined time elapses and there is an interruption by the TEI monitoring timer, the processing for monitoring the TEI (FIGS. 10A and 10B) is executed (steps S3 and S4).

Further, if there is a timer interruption by the SETUP monitoring timer, the processing for monitoring the SETUP (FIGS. 11A and 11B) is executed (steps S5 and S6).

Further, if the communication control unit 2 receives the RR-P frame sent by the network and designating the TEI of the active unit, the communication control unit 1, catching that reception, executes the RR-F monitoring processing (see detailed in FIGS. 12A and 12B) (steps S7 and S8) respectively of FIGS. 9A and 9B.

The processing for monitoring the TEI is performed as shown in FIGS. 10A and 10B.

First, at step S10, the TEI/ID verification request is sent to the network. Next, at step S1, the signal line control circuit 108 shown in FIG. 6 is instructed to switch from the transmission to reception mode, the internal modes of the multiplexer 103 and the selector 104 are switched, and the stand-by unit is made able (i.e., enabled) to receive the signals sent by the active unit to the network.

At step S12, the timer for monitoring the response of the active unit to the TEI/ID check request from the network over a predetermined time is made to start (i.e., initiated).

At step S13, whether there is an TEI/ID check response of the active unit or not is monitored. If there is an ID check response within the predetermined time period, the routine proceeds to step S14. If the time runs out without any ID check response within the predetermined time period (FIG. 10B), the processing from step S20 is executed.

At step S14 (FIG. 10A), if a TEI/ID check response from the active unit is detected, the timer for monitoring the time is made to stop. Next, at step S15, whether or not the content of the ID check response, sent by the active unit to the network, is legitimate or not is checked. When the content of the response is correct in value, the signal line control circuit 108 of FIG. 6 is instructed to restore the reception mode, switched to at step S11, to the original transmission mode (steps S16 and S17). After this, the step S3 shown in FIG. 9A is returned to and the monitoring is similarly repeated.

When the content of the ID check response is not correct, the unit switching processing (see details in FIGS. 13A and 13B) is executed (step S18).

Further, when the active unit does not respond to the TEI/ID check request and the time runs out, first, at step S20, the signal line control circuit 108 is instructed to restore the reception mode to the original transmission mode (step S20). Next, the processing for monitoring the TEI is ended and the unit switching processing (FIGS. 13A and 13B) is executed (steps S21 and S22).

The processing for monitoring the SETUP at step S6 of FIG. 9B is performed as shown in FIGS. 11A and 11B.

First, at step S30, the SETUP (origination sequence) is sent to the network. Next, at step S31, the first timer <1> for monitoring the receipt of the SETUP (reception sequence) from the network is made to start. At step S32, the reception of the SETUP is monitored. If received within the predetermined time, the routine proceeds to step S33. If not received within the predetermined time, the processing from step S41 is executed.

At step S33, the signal line control circuit 108 shown in FIG. 6 is instructed to switch from the transmission to the reception mode, the internal statuses of the multiplexer 103 and the selector 104 are switched, and the stand-by unit is made able to receive the signals transmitted by the active unit to the network.

At step S34, the second timer <2>, for monitoring if there is a REL (release) response of the active unit to the SETUP within a predetermined time, is made to start (i.e., is initiated).

At step S35, the REL response from the active unit is monitored. If there is an REL response within the predetermined time, the routine proceeds to step S36. If the time runs out without a REL response within the predetermined time, the processing from step S40 is executed.

At step S36, if an REL response from the active unit is detected, the first and second timers for monitoring the elapsed time are made to stop. Next, at step S37, whether or not the content of the REL response sent by the active unit to the network is legitimate or not is checked. When the content of the response is correct in value, the signal line control circuit 108 of FIG. 6 is instructed to restore the reception mode, switched to at step S33, to the original transmission mode (steps S38 and S39). After this, the monitoring shown in FIGS. 9A and 9B is similarly repeated.

When the content of the REL response is not correct, the unit switching processing (FIGS. 13A and 13B) is executed (step S40 in FIG. 11B).

Further, if the time runs out during the monitoring of the reception of the SETUP with no notification of any sort from the network, at step S41 of FIG. 11B, the computer 3 is notified of an abnormality in the network. Next, at step S42, the processing for monitoring the SETUP is ended.

Further, when there is no REL response from the active unit within the predetermined time after the receipt of the SETUP from the network, first, at step S43, the signal line control circuit 108 is instructed to restore the reception mode (S33) to the original transmission mode. Next, the processing for monitoring the SETUP is ended (step S44) and the unit switching processing (FIGS. 13A and 13B) is executed (step S45).

The processing for monitoring the RR-F frame at step S8 of FIG. 9B is performed as shown in FIGS. 12A and 12B.

First, at step S50, to monitor the transmission of the RR-F frame from the active unit to the network, the signal line control circuit 108 shown in FIG. 6 is instructed to switch from the transmission mode to the reception mode, the internal modes of the multiplexer 103 and selector 104 are switched, and the stand-by unit is made able (i.e., enabled) to receive the signals transmitted by the active unit to the network.

Next, at step S51, the timer for seeing, or determining if the RR-F frame is sent from the active unit in a predetermined time, or not, is made (i.e., initiated) to start.

At step S52, whether the RR-F frame has been sent over the transmission signal lines 6 to the network or not is monitored. If the RR-F frame is detected, step S53 is proceeded to. If the RR-F frame is not detected within a predetermined time, the processing from step S60 on is executed.

At step S53, the timer which had been started at step S51 is made to stop. Next, at step S54, whether the content of the response in the RR-F frame, which the active unit sent, is correct or not is checked. When the content of the response is correct in value, an instruction is issued to the signal line control circuit 108 of FIG. 6 and the reception mode is restored to (i.e., switched back to) the original transmission mode (steps S55 and S56). After this, the monitoring shown in FIGS. 9A and 9B is similarly repeated.

When the content of the response in the RR-F frame is not correct, the unit switching processing (FIGS. 13A and 13B) is executed (step S51 in FIG. 12B).

Further, if the time runs out in the monitoring of the RR-F frame with still no response from the active unit, then at step S60 the signal line control circuit 108 is instructed to restore (i.e., switch back from) the reception mode to the original transmission mode. Next, the RR-F monitoring processing is ended (step S61) and the unit switching processing (see details in FIGS. 13A and 13B) is executed (step S62 of FIG. 12B).

When an abnormality in the master system (active unit) communication control unit is detected, the slave system communication control unit executes the processing shown in FIGS. 13A and 13B.

First, at step S70, the abnormality in the master system is notified to the computer 3. Next, at step S71, the diagnostic processing is ended (i.e., completed), then at step S72, preparatory processing is performed, such as a transfer of information needed for the slave system (stand-by unit) to act as a master system (active unit).

At step S73, an instruction from the computer 3 for switching the master system is awaited. When there is an instruction for switching the master system, at step S74, the path is switched for enabling what had been the stand-by unit to operate as the active unit. Next, the communication control operation is started with the new active unit.

On the other hand, when receiving notification of an abnormality in the master system at step S70, the computer 3 resets the current master system at step S80. Next, at step S81, it instructs the switching of the path to the slave system and starts communication with the slave system. After this, it performs the processing for communication by the communication control unit of the slave system.

Above, the explanation was made of an example of one stand-by unit monitoring and switching with one active unit, but in the system as shown in FIG. 2B, it is possible for one stand-by unit to monitor the TEI values etc. of a plurality of active units and thereby monitor and switch by an N-to-1 configuration. At this time, when one of the channels among a plurality of channels is used for the operation, a single stand-by unit can switch with a plurality of active units. For example, in the case of the ISDN-Basic Rate Interface (BRI), there are two B-channels, so by switching to the stand-by unit for each channel, it becomes possible for a single stand-by unit to back up two active units.

As explained above, according to the present invention, by the stand-by communication control unit checking for the normal operation of the active communication control unit using data not obstructing communication of normal services, confirmation of the communication function itself and timely detection of abnormalities in the active unit become possible. Further, by the stand-by unit becoming communicable in state, duplexing of communication control units connected to an ISDN etc., which could not be realized in the related art, becomes possible.

We claim:

1. A communication control unit connectable over a corresponding line to a communication network, having an ID verification function, as either an active unit or a stand-by unit, comprising:

means for switching the respective communication control unit to function as a selected one of the active and stand-by units;

means for sending an ID verification request to the communication network with an address identifying a different communication control unit, connected over a corresponding, different line to the communication network, to function as the active unit, when the respective communication control unit is switched to function as the stand-by unit;

means for monitoring if the active, different communication control unit responds to the ID check request from the communication network; and the switching means switches from the active, different communication control unit to the stand-by, respective unit and uses the respective unit as an active unit without disconnecting the corresponding line when the active, different communication control unit does not return the expected response.

2. A communication control unit as set forth in claim 1, further comprising:

means for detecting a hardware abnormality of the active, different communication control unit when the respective unit is used as the stand-by unit; and the switching means, further, is operative when the respective communication control unit is being used as a stand-by unit and when the detecting means detects a hardware abnormality, to switch the respective communication control unit to function as an active unit, without disconnecting the corresponding line.

3. A communication control unit as set forth in claim 1, further comprising:

means for sending a SETUP of a different high layer compatibility to the active, different communication control unit when the respective unit is switched to function as a stand-by unit;

means for monitoring if the active, different communication control unit responds to the SETUP; and means for switching the active, different communication control unit to function as a stand-by, different communication control unit and for switching the respective unit to function as the active unit when the active, different communication control unit does not suitably respond.

4. A communication control unit as set forth in claim 2, further comprising:

means for sending a SETUP of a different high layer compatibility to the active, different communication control unit when the respective unit is switched to function as a stand-by unit;

means for monitoring if the active, different communication control unit responds to the SETUP; and means for switching the active, different communication control unit to function as the stand-by communication control unit and switching the respective unit to function as the active unit when the active, different communication control unit does not suitably respond.

5. A communication control unit as set forth in claim 1, further comprising:

means for monitoring a response of an RR frame in a signal link from the active, different communication control unit when the respective unit is used as the stand-by unit; and means for switching the active, different communication control unit to function as the stand-by communication control unit and switching the respective unit to function as the active unit when the active, different communication control unit does not suitably respond to the RR frame.

6. A communication control unit as set forth in claim 2, further comprising:

means for monitoring a response of an RR frame in a signal link from the active, different communication control unit when the respective unit is used as the stand-by unit; and means for switching the active, different communication control unit to function as the stand-by communication control unit and switching the respective unit to function as the active unit when the active, different communication control unit does not suitably respond to the RR frame.

7. A communication control unit as set forth in claim 3, further comprising:

means for monitoring a response of an RR frame in a signal link from the active, different communication control unit when the respective unit is used as the stand-by unit; and means for switching the active, different communication control unit to function as the stand-by communication control unit and switching the respective unit to function as the active unit when the active, different communication control unit does not suitably respond to the RR frame.

8. A communication control unit as set forth in claim 1, further comprising:

means for guiding transmission information, sent to the active, different communication control unit, to a reception circuit used for receiving reception information from the communication network so as to monitor the response of the active, different communication control unit.

9. A communication control unit as set forth in claim 2, further comprising:

means for guiding transmission information, sent to the active, different communication control unit, to a reception circuit used for receiving reception information from the communication network so as to monitor the response of the active, different communication control unit.

10. A communication control unit as set forth in claim 3, further comprising:

means for guiding transmission information, sent to the active, different communication control unit, to a reception circuit used for receiving reception information from the communication network so as to monitor the response of the active, different communication control unit.

11. A communication control unit as set forth in claim 4, further comprising:

means for guiding transmission information, sent to the active, different communication control unit, to a reception circuit used for receiving reception information from the communication network so as to monitor the response of the active, different communication control unit.

12. A communication control unit as set forth in claim 5, further comprising:

means for guiding transmission information, sent to the active, different communication control unit, to a reception circuit used for receiving reception information from the communication network so as to monitor the response of the active, different communication control unit.

13. A communication control unit as set forth in claim 6, further comprising:

means for guiding transmission information, sent to the active, different communication control unit, to a reception circuit used for receiving reception information from the communication network so as to monitor the response of the active, different communication control unit.

14. A communication control unit as set forth in claim 7, further comprising:

means for guiding transmission information, sent to the active, different communication control unit, to a reception circuit used for receiving reception information from the communication network so as to monitor the response of the active, different communication control unit.

15. A communication control unit as set forth in claim 1, wherein said communication network having said ID verification function is an ISDN.

16. A communication control unit as set forth in claim 1, which is one of a plurality of communication control units accommodated in a single casing or one of a plurality of communication control units mounted on a single board.

17. A communication control system, comprising:

a first communication control unit functioning as an active unit and connected through a corresponding line to a communications network;

a second communication control unit connected through a corresponding, different line to the communication network and functioning as a stand-by unit and to monitor the active communication control unit; and the stand-by second communication control unit switches with the active, different communication control unit and functions as the active unit, without disconnecting the corresponding line, when the active, different, first communication control unit does not return an expected response to an ID check request.

18. A method for controlling the switching of communication control units connected over a common network, comprising:

sending an ID verification request from a stand-by, first communication control unit to the communication network with an address identifying an active, second communication control unit;

monitoring if the active, second communication control unit has responded to an ID check request from the communication network; and switching from the active, first communication control unit to the stand-by, second communication control unit to function as the active unit and without disconnecting the first communication control unit from the communication network when it is found, as a result of the monitoring, that the active, first communication control unit has not returned the expected response.

19. A communication control unit connected to a communication network and selectively functioning as an active unit or a stand-by unit, comprising:

means for sending a signal to the communication network with an address identifying a different communication control unit as the active unit when the respective unit is used as the stand-by unit;

means for monitoring if the different, active communication control unit responds with a response signal to the signal from the communication network; and means for switching from the active, different communication control unit to the stand-by, respective unit and using the respective unit as the active unit without disconnecting the active, different communication control unit from the network when it is found, as a result of the monitoring, that the active, different communication control unit has not returned the expected response.

20. A communication control unit connectable to a communication network, having an ID verification function and used as an active unit or a stand-by unit, comprising:

a send unit sending an ID verification request to the communication network with an address identifying a different communication control unit, connected to the communication network as an active communication control unit, when the respective communication control unit is used as a stand-by unit;

a monitor monitoring if the active, different communication control unit responds to an ID check request from the communication network in response to the ID verification request; and a switch switching the respective communication control unit, when used as a stand-by unit, to take over the process of the active, different communication control unit and without disconnecting the active, different communication control unit from the communication network, when the active, different communication control unit does not return the expected response.

21. A communication control unit as set forth in claim 20, further comprising:

a detector detecting a hardware abnormality of the active, different communication control unit when the respective communication control unit is used as a stand-by unit; and the switch switches the respective communication control unit, when used as a stand-by unit, to take over the process of the active, different communication control unit, and without disconnecting the active, different communication control unit from the communication network, when the hardware abnormality is detected.

22. A communication control unit as set forth in claim 20, further comprising:

a send unit sending a SETUP of a different high layer compatibility to the active, different communication control unit when the respective communication control unit is used as a stand-by unit;

a monitor monitoring if the active, different communication control unit responds to the SETUP; and the switch switches the respective communication control unit, when used as a stand-by unit, to take over the process of the active, different communication control unit, and without disconnecting the active, different communication control unit from the communication network, when the active, different communication control unit does not suitably respond to the SETUP.

23. A communication control unit as set forth in claim 21, further comprising:

a send unit sending a SETUP of a different high layer compatibility to the active, different communication control unit when the respective communication control unit is used as a stand-by unit;

a monitor monitoring if the active, different communication control unit responds to the SETUP; and the switch switches the respective communication control unit, when used as a stand-by unit, to take over the process of the active, different communication control unit, and without disconnecting the active, different communication control unit from the communication network, when the active, different communication control unit does not suitably respond to the SETUP.

24. A communication control unit as set forth in claim 20, further comprising:

a monitor monitoring a response of the active, different communication control unit to an RR frame in a signal link from the active communication control unit when the respective communication control unit is used as a stand-by unit; and the switch switches the respective communication control unit, when used as a stand-by unit, to take over the process of the active, different communication control unit, and without disconnecting the active, different communication control unit from the communication network, when the active communication control unit does not suitably respond to the RR frame.

25. A communication control unit as set forth in claim 21, further comprising:

a monitor monitoring a response of the active, different communication control unit to an RR frame in a signal link from the active communication control unit when the respective communication control unit is used as a stand-by unit; and the switch switches the respective communication control unit, when used as a stand-by unit, to take over the process of the active, different communication control unit, and without disconnecting the active, different communication control unit from the communication network, when the active communication control unit does not suitably respond to the RR frame.

26. A communication control unit as set forth in claim 22, further comprising:

a monitor monitoring a response of the active, different communication control unit to an RR frame in a signal link from the active communication control unit when the respective communication control unit is used as a stand-by unit; and the switch switches the respective communication control unit, when used as a stand-by unit, to take over the process of the active, different communication control unit, and without disconnecting the active, different communication control unit from the communication network, when the active communication control unit does not suitably respond to the RR frame.

27. A communication control unit as set forth in claim 20, further comprising:

a guide guiding transmission information, sent from the active, different communication control unit, to a reception circuit used for receiving reception information from the communication network so as to monitor the response of the active, different communication control unit.

28. A communication control unit as set forth in claim 21, further comprising:

a guide guiding transmission information, sent from the active, different communication control unit, to a reception circuit used for receiving reception information from the communication network so as to monitor the response of the active, different communication control unit.

29. A communication control unit as set forth in claim 22, further comprising:

a guide guiding transmission information, sent from the active, different communication control unit, to a reception circuit used for receiving reception information from the communication network so as to monitor the response of the active, different communication control unit.

30. A communication control unit as set forth in claim 23, further comprising:

a guide guiding transmission information, sent from the active, different communication control unit, to a reception circuit used for receiving reception information from the communication network so as to monitor the response of the active, different communication control unit.

31. A communication control unit as set forth in claim 24, further comprising:

a guide guiding transmission information, sent from the active, different communication control unit, to a reception circuit used for receiving reception information from the communication network so as to monitor the response of the active, different communication control unit.

32. A communication control unit as set forth in claim 25, further comprising:

a guide guiding transmission information, sent from the active, different communication control unit, to a reception circuit used for receiving reception information from the communication network so as to monitor the response of the active, different communication control unit.

33. A communication control unit as set forth in claim 26, further comprising:

a guide guiding transmission information, sent from the active, different communication control unit, to a reception circuit used for receiving reception information from the communication network so as to monitor the response of the active, different communication control unit.

34. A communication control unit as set forth in claim 20, wherein said communication network having said ID verification function is an ISDN.

35. A communication control unit as set forth in claim 20 which is one of a plurality of communication control units accommodated in a single casing or one of a plurality of communication control units mounted on a single board.

36. A communication control apparatus, comprising:

at least one communication control unit operating as an initial active unit;

at least one communication control unit operating as an initial stand-by unit wherein said stand-by communication control unit is used to monitor the initial active communication control unit; and said initial stand-by communication control unit switches with the initial active communication control unit and is used as a current active unit without disconnecting the initial active unit when the initial active communication control unit does not return an expected response to an ID check request.

37. A method for controlling the switching of communication control units, comprising:

connecting an active communication control unit and a stand-by communication control unit to a common network;

sending an ID verification request from the stand-by communication control unit to the communication network with an address identifying the active communication control unit;

monitoring if the active communication control unit has responded to an ID check request from the communication network; and switching from the active communication control unit to the stand-by communication control unit without disconnecting the active communication control unit from the communication network when it is found, as a result of the monitoring, that the active communication control unit has not returned the expected response.

38. A communication control unit connected to a communication network and used as an active unit or a stand-by unit, comprising:

a unit sending a signal to the communication network with an address identifying another communication control unit connected to the communication network as an active communication control unit when the subject communication control unit is used as a stand-by unit;

a monitor monitoring if the active communication control unit responds with a response signal to the signal from the communication network; and a switch operating, when the subject communication control unit is used as a stand-by unit, to cause the subject communication control unit to take over the process of the active communication control unit without disconnecting the active communication control unit from the communication network when it is found as a result of the monitoring that the active communication control unit does not return the expected response.

39. A communication control unit, comprising:

a sending unit operative as a stand-by unit and sending an ID verification request to a communication network with an address identifying another communication control unit, connected thereto and functioning as a current, active unit; and a switch, in response to the active communication control unit not returning an expected response to the ID verification request, switching the respective communication control unit to function as an active communication control unit without disconnecting the current, active unit from the communication network from the line.

\* \* \* \* \*